US012812043B2

(12) United States Patent
Oya

(10) Patent No.: US 12,812,043 B2
(45) Date of Patent: Nov. 24, 2026

(54) DIAGNOSTIC APPARATUS, METHOD FOR CONTROLLING SAME, AND STORAGE MEDIUM

(71) Applicant: Canon Kabushiki Kaisha, Tokyo (JP)

(72) Inventor: Masashi Oya, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 18/443,389

(22) Filed: Feb. 16, 2024

(65) Prior Publication Data

US 2024/0283873 A1 Aug. 22, 2024

(30) Foreign Application Priority Data

Feb. 21, 2023 (JP) ................................ 2023-025526

(51) Int. Cl.
*H04N 1/00* (2006.01)

(52) U.S. Cl.
CPC ..... *H04N 1/00029* (2013.01); *H04N 1/00013* (2013.01); *H04N 1/00039* (2013.01)

(58) Field of Classification Search
CPC ........... H04N 1/00029; H04N 1/00013; H04N 1/00039; H04N 1/00005; H04N 1/00037
USPC ........................................................ 358/1.14
See application file for complete search history.

(56) References Cited

U.S. PATENT DOCUMENTS

2015/0146264 A1* 5/2015 Ikari .................. H04N 1/00034 358/406
2017/0118356 A1* 4/2017 Middleton ......... H04N 1/00076
2021/0070069 A1* 3/2021 Chuto ................ H04N 1/00031

FOREIGN PATENT DOCUMENTS

JP 2015103909 A 6/2015

* cited by examiner

*Primary Examiner* — Neil R McLean
(74) *Attorney, Agent, or Firm* — Venable LLP

(57) ABSTRACT

The present invention is directed to a diagnostic apparatus for diagnosing an abnormal portion of an image forming apparatus, comprising: extracting a diagnosis region for specifying the abnormal portion from a read image obtained by a reading unit reading a printing medium conveyed along a conveying path from an image forming unit; determining an abnormality in the extracted diagnosis region; and specifying the abnormal portion on a basis of a result of the determining, wherein the diagnosis region includes an external region which is a region outside the printing medium of the read image.

13 Claims, 14 Drawing Sheets

| | | | | | | | | | |
|---|---|---|---|---|---|---|---|---|---|
| 12 | 10 | 6 | 8 | 4 | 9 | 6 | 5 | 1 | 7 |
| 0 | 10 | 5 | 9 | 10 | 7 | 10 | 6 | 3 | 8 |
| 9 | 7 | 7 | 10 | 8 | 7 | 6 | 10 | 0 | 10 |
| 10 | 4 | 5 | 3 | 7 | 8 | 4 | 3 | 12 | 4 |
| 7 | 10 | 2 | 6 | 4 | 8 | 10 | 3 | 3 | 1 |
| 3 | 10 | 12 | 2 | 12 | 0 | 4 | 3 | 5 | 8 |

| | | | | | | | | | |
|---|---|---|---|---|---|---|---|---|---|
| 7 | 7 | 8 | 5 | 2 | 6 | 7 | 5 | 6 | 6 |

| | | | | | | | | | |
|---|---|---|---|---|---|---|---|---|---|
| -1 | 0 | -1 | 1 | 4 | 1 | -1 | 1 | 0 | 0 |

DIAGNOSTIC APPARATUS, METHOD FOR CONTROLLING SAME, AND STORAGE MEDIUM

BACKGROUND OF THE INVENTION

Field of the Invention

The present invention relates to a diagnostic apparatus, a method for controlling the same, and a storage medium.

Description of the Related Art

In a known image diagnostic technique that uses an image forming apparatus (image forming system) provided with a printing unit and an image reading unit, a diagnostic chart printed by the printing unit is read by the image reading unit, and an abnormal portion in the apparatus is diagnosed from the image data. Japanese Patent Laid-Open No. 2015-103909 describes a technique using a diagnostic chart printed by a printing unit and a blank paper to determine whether or not there is an abnormality in an image reading unit, which is a part of an image forming apparatus, where the user can directly insert the chart. In this apparatus, a no-image portion of the blank paper is searched for streaks in a document conveying direction with different read values from the surroundings, and if a streak is found, it is determined to be an abnormal pixel.

However, in a case where the chart cannot be directly inserted into the image reading unit, there is a possibility of the blank paper being marked at a stage prior to reading and causing this to be determined as an abnormal pixel. In other words, since the chart cannot be directly inserted into the image reading unit, it is necessary to feed paper via the printing unit, and the printing unit being dirty may cause marks such as streaks when paper is fed, for example. When an abnormal pixel is detected in such cases, it may be determined as an abnormality in the image reading unit.

SUMMARY OF THE INVENTION

The present invention enables realization of a mechanism for suitably setting a diagnosis region in a read image and for improving the accuracy of specifying an abnormal portion of an apparatus.

One aspect of the present invention provides a diagnostic apparatus for diagnosing an abnormal portion of an image forming apparatus, comprising: at least one memory device that stores a set of instructions; and at least one processor that executes the set of instructions to extract a diagnosis region for specifying the abnormal portion from a read image obtained by a reading unit reading a printing medium conveyed along a conveying path from an image forming unit, determine an abnormality in the extracted diagnosis region, and specify the abnormal portion on a basis of a result of the determination, wherein the diagnosis region includes an external region which is a region outside the printing medium of the read image.

Another aspect of the present invention provides a diagnostic apparatus for diagnosing an abnormal portion of an image forming apparatus, comprising: at least one memory device that stores a set of instructions; and at least one processor that executes the set of instructions to extract a diagnosis region for specifying the abnormal portion from a read image obtained by a reading unit reading a printing medium conveyed along a conveying path from an image forming unit, determine an abnormality in the extracted diagnosis region, specify the abnormal portion on a basis of a result of the determination, and wherein the diagnosis region includes at least two types of regions in the read image with different read densities.

Still another aspect of the present invention provides a method for controlling a diagnostic apparatus for diagnosing an abnormal portion of an image forming apparatus, comprising: extracting a diagnosis region for specifying the abnormal portion from a read image obtained by a reading unit reading a printing medium conveyed along a conveying path from an image forming unit; determining an abnormality in the extracted diagnosis region; and specifying the abnormal portion on a basis of a result of the determining, wherein the diagnosis region includes an external region which is a region outside the printing medium of the read image.

Yet still another aspect of the present invention provides a method for controlling a diagnostic apparatus for diagnosing an abnormal portion of an image forming apparatus, comprising: extracting a diagnosis region for specifying the abnormal portion from a read image obtained by a reading unit reading a printing medium conveyed along a conveying path from an image forming unit; determining an abnormality in the extracted diagnosis region; and specifying the abnormal portion on a basis of a result of the determining, wherein the diagnosis region includes at least two types of regions in the read image with different read densities.

Further features of the present invention will be apparent from the following description of exemplary embodiments with reference to the attached drawings.

DESCRIPTION OF THE EMBODIMENTS

Figure 1:
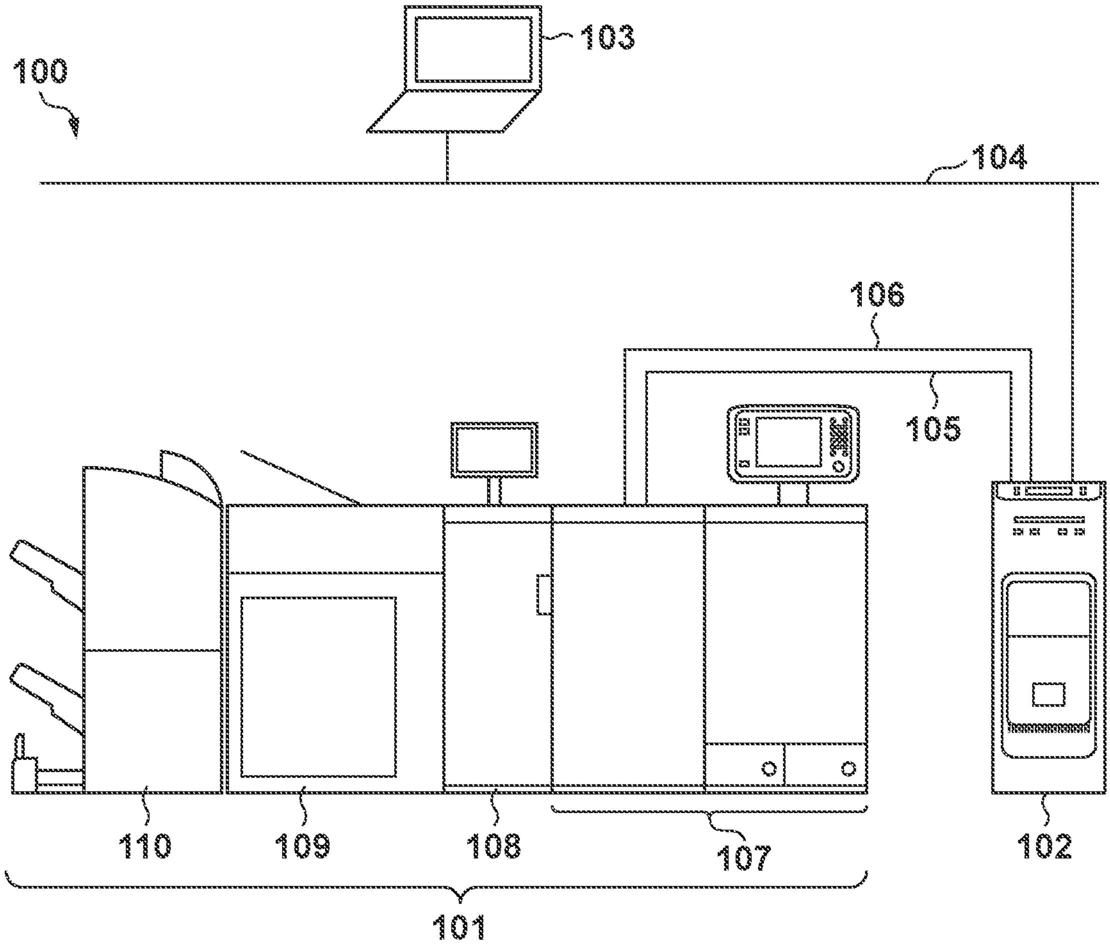
FIG. 1 is a diagram illustrating an example of a network configuration including an image forming system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Overall System Configuration

The first embodiment of the present invention will be described below. First, an example of a network configuration including an image forming system according to the present embodiment will be described with reference to FIG. 1. As illustrated in FIG. 1, an image forming system 100 includes an image forming apparatus 101 and an external controller 102. The image forming apparatus 101 and the external controller 102 are communicatively connected via an internal LAN 105 and a video cable 106. Also, the external controller 102 is communicatively connected a client PC 103 via an external LAN 104. Note that the image forming apparatus 101 and the external controller 102 may be integrally formed as a single apparatus.

The client PC 103 can send a printing instruction to the external controller 102 via the external LAN 104. The client PC 103 is installed with a printer driver with a function for converting the image data corresponding to the target of printing processing into a page description language (PDL) that can be processed by the external controller 102. The user who wishes to print can operate the client PC 103 to send a printing instruction from various applications installed in the client PC 103 via the printer driver. The printer driver transmits PDL data, which is print data, to the external controller 102 on the basis of the printing instruction from the user. When the external controller 102 receives the PDL data from the client PC 103, the external controller 102 parses and interprets the received PDL data. The external controller 102 executes rasterize processing on the basis of the interpreting result, generates a bitmap image (print image data) with a resolution suitable for the image forming apparatus 101, and supplies a print job to the image forming apparatus 101 to send a printing instruction.

Next, the image forming apparatus 101 will be described. The image forming apparatus 101 includes an apparatus with various different functions and can execute complex printing processes such as binding and the like. The image forming apparatus 101 includes a printing unit 107, a diagnosis unit 108, a stacker 109, and a finisher 110. Each module will be described below. In the present embodiment described below, the image forming apparatus 101 and the modules have an integrated configuration. However, each module may be provided as an independent apparatus. Also, in the example described below, the image reading unit described below is provided in the diagnosis unit 108. However, the image reading unit may be provided as an independent reading apparatus or may be integrally formed with the printing unit 107.

The printing unit 107 is a printing apparatus that prints an image according to a print job supplied from the external controller 102 and discharges a post-print printing medium. Here, a printing medium refers to any media for forming an image, such as a sheet, plain paper, thick paper, and the like, but no such limitation is intended to the present invention. The post-print printing medium discharged from the printing unit 107 is conveyed through the inside of each apparatus in order of the diagnosis unit 108, the stacker 109, and the finisher 110. In the present embodiment, an image forming apparatus 101 of the image forming system 100 is used as an example of an image forming apparatus, but the printing unit 107 included in the image forming apparatus 101 may also be referred to as an image forming apparatus. The printing unit 107 uses toner (developing agent) of a plurality of colors to form (print) an image on the printing medium fed and conveyed from the feeding unit disposed at the lower portion of the printing unit 107.

The diagnosis unit 108 is a diagnostic apparatus that uses a post-print printing medium, on which an image has been printed by the printing unit 107, conveyed along the conveying path to diagnose whether or not there is an abnormal portion in the image forming apparatus 101. Specifically, the diagnosis unit 108 reads the image printed on the conveyed post-print printing medium and performs a diagnosis using the obtained read image. In the present embodiment described below, the diagnosis of an abnormality in the image reading unit will be mainly focused on. Abnormality diagnosis includes determining by extracting a diagnosis region from the read image and checking the difference between read signal values in the extracted diagnosis region. Furthermore, on the basis of this diagnostic result, a printing unit abnormality determination is performed using the read image. The processing of the diagnosis unit will be described below in detail. Note that the application of the diagnosis unit is not limited to this example. In other words, an inspection function for inspecting whether or not there is a printing abnormality on the post-print printing medium may be further provided.

The stacker 109 is an apparatus that can stack multiple copies of post-print printing media. The finisher 110 is an apparatus that can perform finishing processes such as a stapling process, a punching process, a saddle stitch binding process, and the like on the conveyed post-print printing medium. A printing medium after being processed by the finisher 110 is discharged to a predetermined discharge tray.

In the example illustrated in FIG. 1, the external controller 102 is connected to the image forming apparatus 101, but no such limitation is intended to the present invention. For example, the image forming apparatus 101 may be connected to the external LAN 104, and print data may be transmitted to the image forming apparatus 101 from the client PC 103 bypassing the external controller 102. In this case, the data analysis and rasterization of the print data is executed by the image forming apparatus 101.

Hardware Configuration of Image Forming Apparatus 101

Next, an example of the hardware configuration of the image forming apparatus 101 according to the present embodiment will be described with reference to FIG. 2. Detailed operations of the image forming apparatus 101 will be described below with reference to FIG. 2.

In the printing unit 107, various types of printing media are stored in feeding decks 301 and 302. Of the printing media stacked in each feeding deck, the printing medium located at the top is separated one piece at a time and fed to a conveying path 303. Image forming stations 304 to 307 each include a photosensitive drum (photosensitive body) and use different color toner to form a toner image on the photosensitive drum. Specifically, the image forming stations 304 to 307 form a toner image using yellow (Y), magenta (M), cyan (C), and black (K).

The toner images of each color formed on the image forming stations 304 to 307 are transferred (primary transfer) in an overlapping manner in order on an intermediate transfer belt 308. The toner image transferred to the intermediate transfer belt 308 is conveyed to a secondary transfer position 309 as the intermediate transfer belt 308 rotates. At the secondary transfer position 309, the toner image from the intermediate transfer belt 308 is transferred (secondary transfer) to the printing medium conveyed along the conveying path 303. The printing medium after the secondary transfer is conveyed to a fixing unit 311.

The fixing unit 311 includes a pressure roller and a heating roller. A fixing process to fix the toner image to the printing medium is performed which includes applying heat and pressure to the printing medium while the printing medium is passed through these rollers. The printing medium after passing through the fixing unit 311 is conveyed to a connection point 315 of the printing unit 107 and the diagnosis unit 108 via a conveying path 312. In this manner, a color image is formed (printed) on the printing medium. In a case where a further fixing process is required depending on the type of the printing medium, the printing medium after passing through the fixing unit 311 is guided to conveying paths 312' and 314 where a fixing unit 313 is provided. The fixing unit 313 performs a further fixing process on the printing medium conveyed along the conveying path 314. The printing medium after passing through the fixing unit 313 is conveyed to the connection point 315.

Also, in a case where the operation mode is set to double-sided printing, after an image is printed on the first surface, the printing medium conveyed along the conveying path 312 or the conveying path 314 is guided to an inverting path 316. The printing medium inverted at the inverting path 316 is guided to a double-sided conveying path 317 and conveyed until the secondary transfer position 309. In this manner, the toner image is transferred onto the second surface opposite the first surface of the printing medium at the secondary transfer position 309. Thereafter, the printing medium is passed through the fixing unit 311 (and the fixing unit 313), thus ending the formation of the color image on the second surface of the printing medium.

After image formation (printing) by the printing unit 107 ends, the post-print printing medium conveyed to the connection point 315 is conveyed to the diagnosis unit 108. The diagnosis unit 108 includes image reading units 331 and 332, each including a contact image sensor (CIS), on a conveying path 330 for conveying the post-print printing medium from the printing unit 107. The image reading units 331 and 332 are disposed at opposing positions on either side of the conveying path 330. The image reading units 331 and 332 are each configured to read the upper surface (first surface) and the lower surface (second surface), respectively, of the printing medium. Note that the image reading units 331 and 332, for example, may be configured of a charge coupled device (CCD) or a line scan camera instead of a CIS.

The diagnosis unit 108 executes diagnosis processing (image diagnosis) to determine whether or not the is an abnormal portion in the image forming apparatus 101 on the basis of an image printed on a post-print printing medium conveyed along the conveying path 330. Specifically, the diagnosis unit 108 uses the image reading units 331 and 332 at the timing when the conveyed post-print printing medium reaches a predetermined position to execute reading processing to read the image of the post-print printing medium.

Figure 3B:
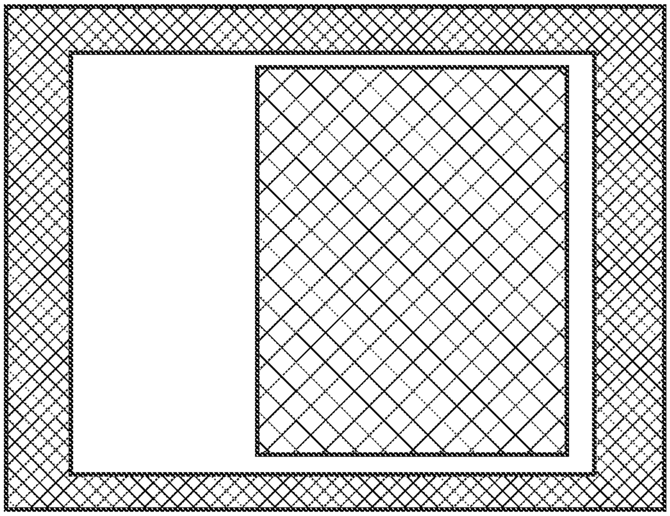
FIGS. 3A and 3B are schematic views illustrating the flow for obtaining a read image in a state with no abnormality in the image forming apparatus according to an embodiment.
Figure 3A:
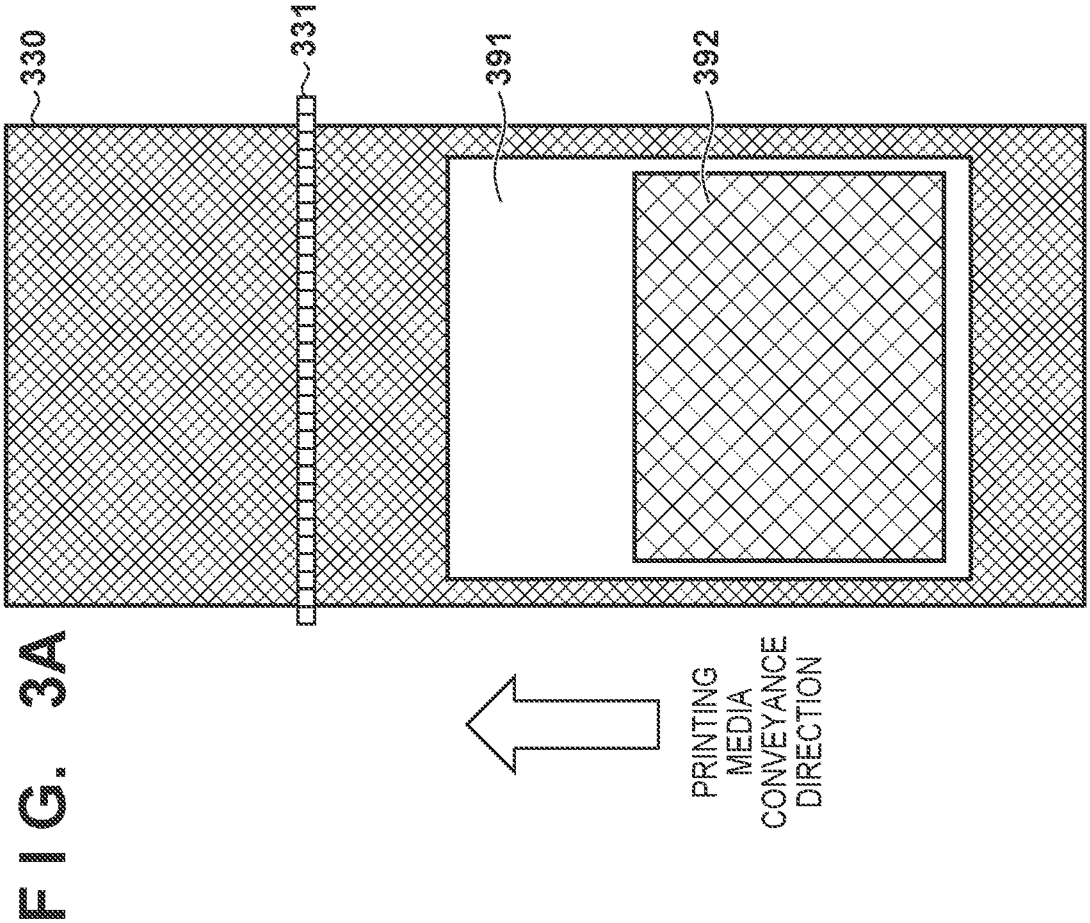

The reading processing of the printing medium according to the present embodiment will now be described with reference to FIGS. 3A and 3B. FIG. 3A illustrates a printing medium 391 printed with an image 392 being conveyed along the conveying path 330 and passing the opposing position of the image reading unit 331. The image reading unit 331 captures an image at the opposing position and obtains a line image orientated orthogonal to the conveyance direction. Line images are continuously obtained and the obtained images are combined to obtain two-dimensional image data (read image) such as that illustrated in FIG. 3B. Obtaining the line images is started at a timing slightly earlier than when the printing medium 391 reaches the lower portion of the image reading unit 331 so that the sheet corners of the printing medium 391 are included in the read image. Thus, the obtained two-dimensional image data is obtained including the underlayer of the conveying path 330. Here, the image reading unit 331 is used as an example, but similar reading processing is executed for the image reading unit 332 as well.

Figure 2:
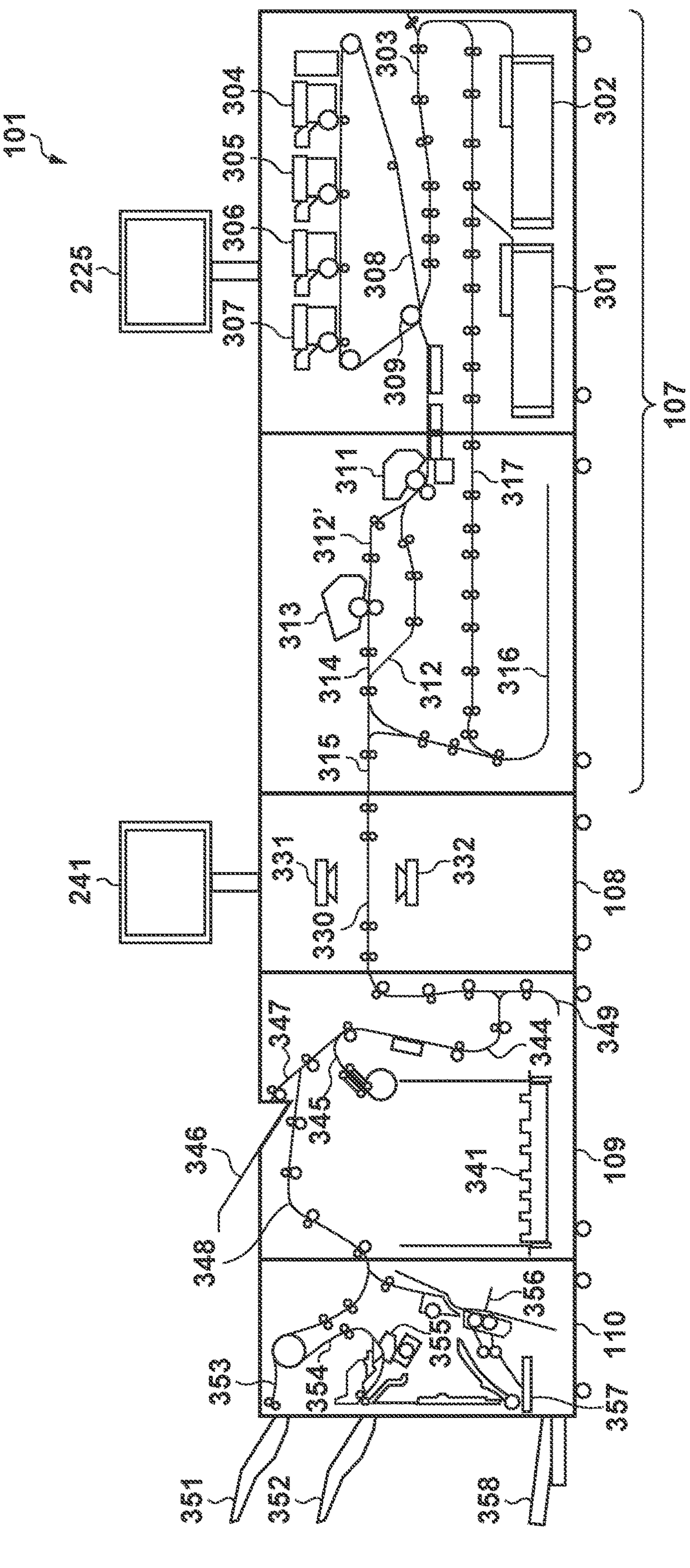
FIG. 2 is a cross-sectional view illustrating an example of the hardware configuration of an image forming apparatus according to an embodiment.
Figure 4B:
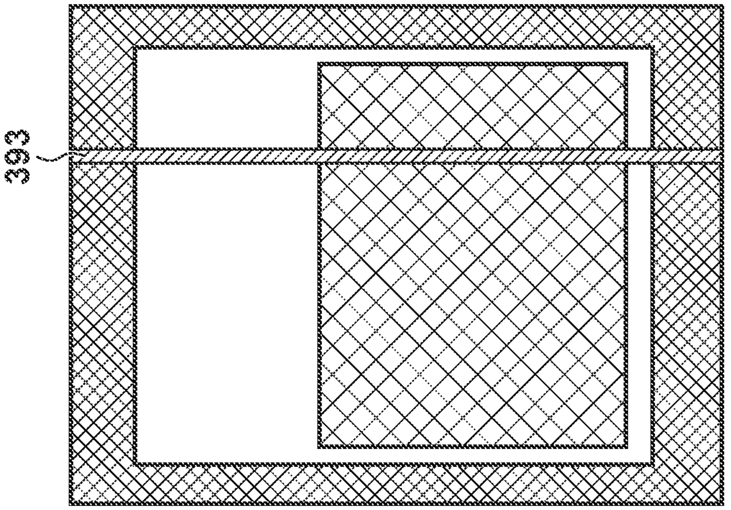
FIGS. 4A and 4B are schematic views illustrating the flow for obtaining a read image in a state with an abnormality in an image forming apparatus according to an embodiment.
Figure 4A:
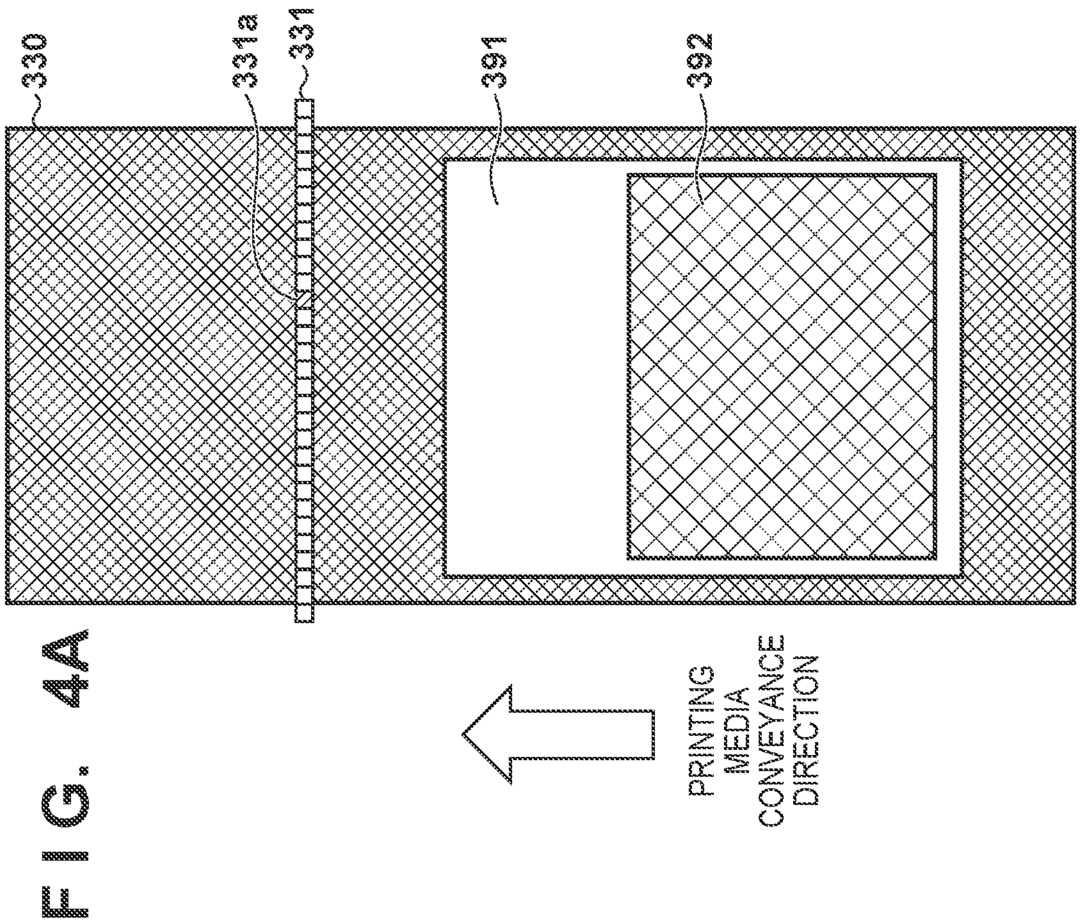

Now we will return to the description of FIG. 2. Also, the diagnosis unit 108 diagnoses whether or not there is an abnormal portion in the image forming apparatus 101 on the basis of the image obtained by the reading processing. In the present embodiment, the diagnosis unit 108 diagnoses whether or not there is an abnormal portion in the image forming apparatus 101 including the image reading unit 331 and the printing unit 107 using the read image. In other words, diagnosis is performed for abnormalities in each device of the image forming apparatus 101. FIGS. 4A and 4B are schematic views in a case where an abnormality has occurred in the image reading unit 331. FIG. 4A illustrates an example where dirt has adhered to the reading glass (not illustrated) between a sensor 331*a* in the image reading unit 331 and the printing medium 391. FIG. 4B illustrates the read image obtained from the state of FIG. 4A. Because of the adhered dirt, there is an abnormality in the reading values at the same main scanning position, causing a streak 393 in the longitudinal direction in the read image.

Figure 5B:
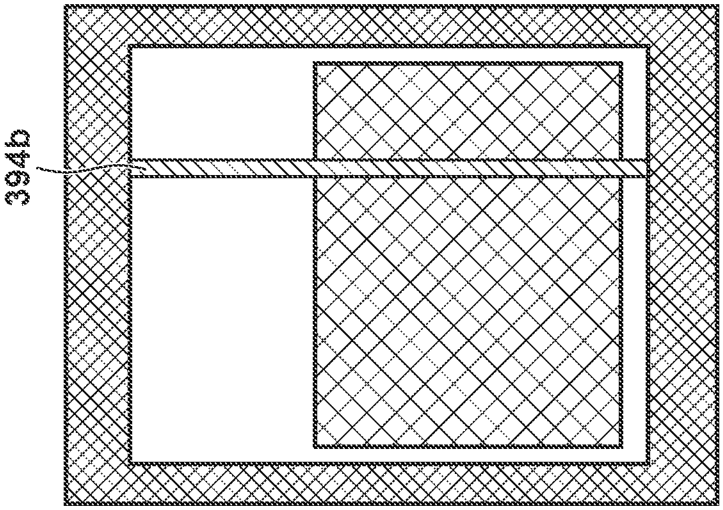
FIGS. 5A and 5B are schematic views illustrating the flow for obtaining a read image in a state with a mark on a printing medium according to an embodiment.
Figure 5A:
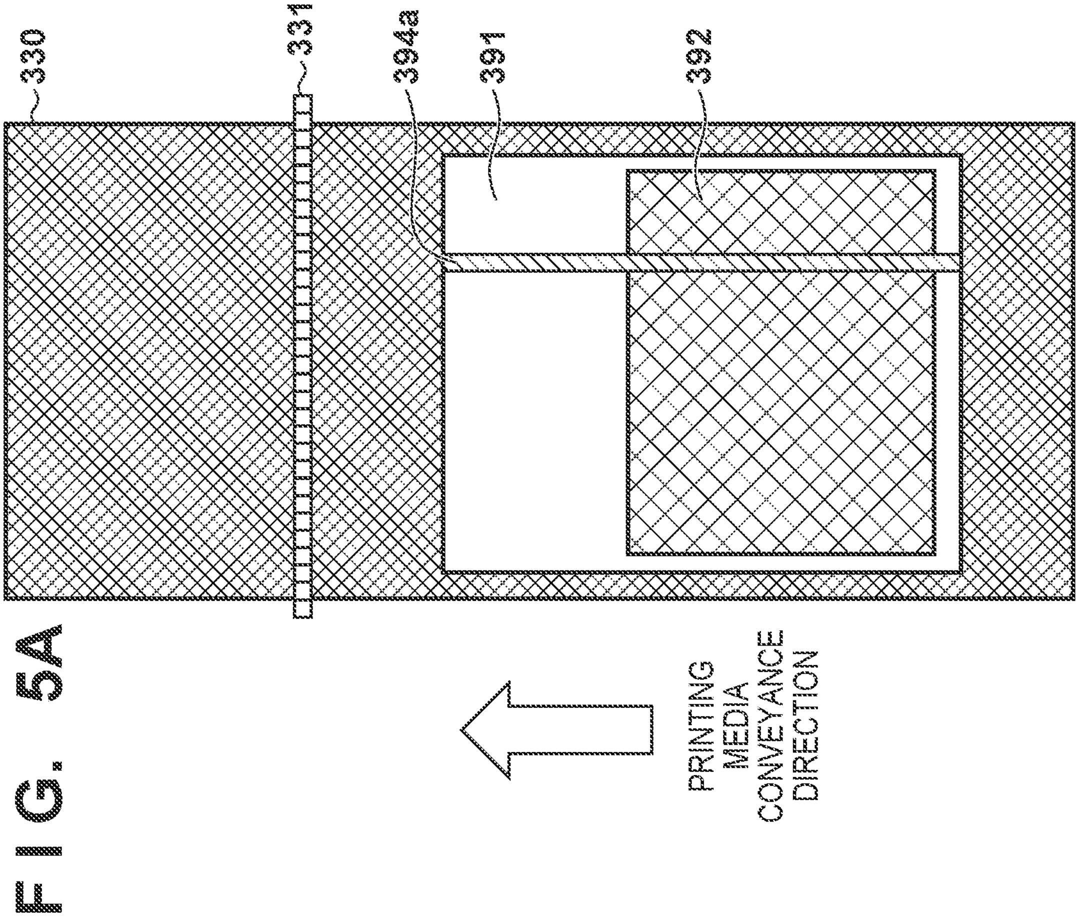

FIGS. 5A and 5B are schematic views in a case where an abnormality has occurred in the printing unit 107. FIG. 5A illustrates an example where a print mark 394*a* has adhered to the printing medium 391 at a stage before reaching the image reading unit 331. The print mark 394*a* is caused by an abnormality in the printing unit 107 or by the printing medium 391 having the mark originally. In a case where the print mark 394*a* is adhered to the printing medium 391, the read image is obtained with a streak 394*b* included.

As seen in FIG. 4B and FIG. 5B, a similar streak (393, 394*a*) is found on the printing medium 391 of the obtained read image. Thus, whether or not there is an abnormality in the image reading units 331 and 332, which are incorporated into the image forming apparatus 101 and cannot be directly inserted with a chart (printing medium) as in the present embodiment, cannot be determined on the basis of whether or not there is a streak in the blank portion of the printing medium 391 in the read image. Here, the blank portion refers to the portion where an image is not formed. On the other hand, as illustrated in FIG. 4B, in a case where an abnormality has occurred in the image reading unit 331, a streak appears across the entire read image, as seen with the streak 393. This kind of streak across the entire read image does not occur on a read image caused by an abnormality in the printing unit 107 as seen with the streak 394*b* in FIG. 5B. Regarding this, in the present embodiment described herein, whether or not there is an abnormality in the image reading units 331 and 332 is determined by including a region obtained by reading the conveying path 330, located around the printing medium 391 included in the read image, in the diagnosis region. The diagnosis processing will be described below in detail.

Now we will return to the description of FIG. 2. The diagnosis unit 108 executes diagnosis on the basis of a diagnosis processing execution instruction from a user. The execution timing of the diagnosis processing is desirably before the start of a print task or after continuous poor printing. The printing medium 391 that passes through the diagnosis unit 108 is conveyed to the stacker 109 in order.

The stacker 109 includes a stack tray 341 as a tray for stacking post-print printing media conveyed from the diagnosis unit 108 disposed on the upstream side in the conveyance direction of the post-print printing media. The post-print printing medium that passes through the diagnosis unit 108 is conveyed along a conveying path 344 inside the stacker 109. By guiding the post-print printing medium conveyed along the conveying path 344 to a conveying path 345, the post-print printing medium is stacked in the stack tray 341.

The stacker 109 further includes an escape tray 346 as a discharge tray. In the present embodiment, the escape tray 346 is used to discharge the printing medium printed with a text chart used for image diagnosis by the diagnosis unit 108. By guiding the post-print printing medium conveyed along the conveying path 344 to a conveying path 347, the post-print printing medium is conveyed to the escape tray 346. On the other hand, a post-print printing medium not stacked and discharged at the stacker 109 is conveyed to the finisher 110 downstream via a conveying path 348.

The stacker 109 further includes an inverting unit 349 for inverting the orientation of the conveyed post-print printing medium. The inverting unit 349, for example, is used to align the orientation of the printing medium input to the stacker 109 and the orientation of the post-print printing medium when stacked in the stack tray 341 and output from the stacker 109. Note that the inverting unit 349 does not perform an inverting operation of post-print printing medium conveyed to the finisher 110 without being stacked in the stacker 109.

The finisher 110 performs a finishing function (post-processing) designated by a user on the post-print printing medium conveyed from the diagnosis unit 108 disposed upstream side in the conveyance direction of the post-print printing medium. In the present embodiment, for example, the finisher 110 includes finishing functions such as a stapling function (bound at one or two portions), a punching function (two or three holes), a saddle stitch binding function, and the like. The finisher 110 includes two discharge trays 351 and 352. In a case where the finisher 110 does not perform a finishing process, the post-print printing medium conveyed to the finisher 110 is discharged to the discharge tray 351 via a conveying path 353. In a case where the finisher 110 performs a finishing process such as a stapling process or the like, the post-print printing medium conveyed to the finisher 110 is guided along a conveying path 354. The finisher 110 performs the finishing process designated by a user on the post-print printing medium conveyed along the conveying path 354 using a processing unit 355 and then discharges the post-print printing medium after the finishing process has been performed to the discharge tray 352.

Functional Configuration Diagram

Figure 6:
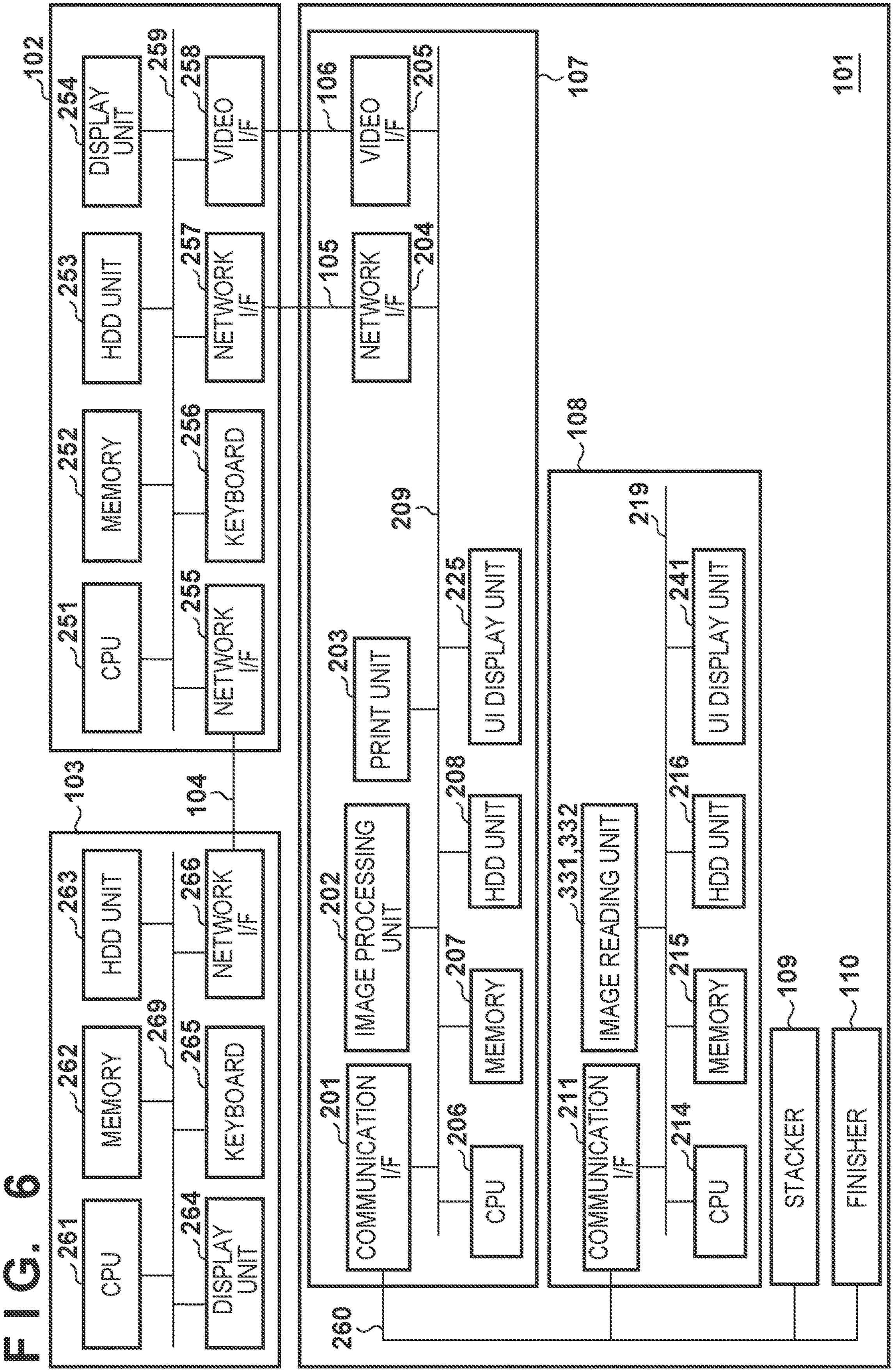
FIG. 6 is a block diagram illustrating the internal configuration of the image forming apparatus, an external controller, and a client PC according to an embodiment.

Next, an example of the functional configuration of the image forming apparatus 101, the external controller 102, and the client PC 103 according to the present embodiment will be described with reference to FIG. 6. Here, the main functional configuration relating to the present invention will be described. Thus, each apparatus may include another functional configuration in addition to or instead of the functional configuration described below.

The printing unit 107 of the image forming apparatus 101 includes a communication interface (I/F) 201, a network I/F 204, a video I/F 205, a CPU 206, a memory 207, an HDD unit 208, and a UI display unit 225. The printing unit 107 further includes an image processing unit 202 and a printing unit 203. These are connected to one another in a manner allowing for the exchange of data via a system bus 209. The communication I/F 201 is connected to the diagnosis unit 108, the stacker 109, and the finisher 110 via a communication cable 260. The CPU 206 performs communications for controlling each apparatus via the communication I/F 201. The network I/F 204 is connected to the external controller 102 via the internal LAN 105 and is used to communicate control data and the like. The video I/F 205 is connected to the external controller 102 via the video cable 106 and is used to communicate data such as image data and the like. Note that it is sufficient that the printing unit 107 (image forming apparatus 101) and the external controller 102 can control the operations of the image forming apparatus 101 via the external controller 102, and they may be connected only by the video cable 106.

The HDD unit 208 stores various types of programs and data. The CPU 206 executes a program stored in the HDD unit 208 to control the overall operations of the printing unit 107. The memory 207 stores programs and data required for when the CPU 206 executes various types of processing. The memory 207 operates as the working area of the CPU 206. The UI display unit 225 accepts the input of various types of settings and operation instructions from a user and is used to display various types of information such as settings information, the processing status of print jobs, and the like.

The diagnosis unit 108 includes a communication I/F 211, a CPU 214, a memory 215, an HDD unit 216, the image reading units 331 and 332, and a UI display unit 241. These devices are connected to one another in a manner allowing for the exchange of data via a system bus 219. The communication I/F 211 is connected to the printing unit 107 via the communication cable 260. The CPU 214 performs the communications required to control the diagnosis unit 108 via the communication I/F 211.

The CPU 214 executes a control program stored in the memory 215 to control the operations of the diagnosis unit 108. The memory 215 stores a control program for the diagnosis unit 108. The image reading units 331 and 332 read an image on the conveyed printing medium as instructed by the CPU 214. The CPU 214 diagnoses whether or not there is an abnormal portion in the image forming apparatus 101 on the basis of the read image for diagnosis read by the image reading units 331 and 332. A diagnosis regarding an abnormality in the image reading units 331 and 332 is made on the basis of whether or not there is a streak in the diagnosis region of the diagnosis image. The UI display unit 241 is used to display the diagnostic result, a settings screen, and the like. The UI display unit 241 also functions as an operation unit that is operated by the user and accepts various types of instructions from the user such as a diagnosis unit 108 settings change instruction, an image diagnosis execution instruction, and the like. The HDD unit 216 stores various types of settings information and image data required for image diagnosis. The various types of settings information and image data stored in the HDD unit 216 can be reused.

The stacker 109 performs control to discharge a post-print printing medium conveyed along a conveying path to the stack tray or the escape tray or to convey it to the finisher 110 connected on the downstream side in the conveyance direction of the post-print printing medium. The finisher 110 performs control to convey or discharge the post-print printing medium and performs finishing processes such as stapling, punching, saddle stitch binding, and the like.

The external controller 102 includes a CPU 251, a memory 252, an HDD unit 253, a keyboard 256, a display unit 254, a network I/F 255 and 257, and a video I/F 258. These devices are connected to one another in a manner allowing for the exchange of data via a system bus 259. The CPU 251 executes a program stored in the HDD unit 253 to control the overall operations of the external controller 102 including, for example, receiving print data from the client PC 103, RIP processing, transmitting print data to the image forming apparatus 101, and the like. The memory 252 stores programs and data required for when the CPU 251 executes various types of processing. The memory 252 operates as the working area of the CPU 251.

The HDD unit 253 stores various types of programs and data. The keyboard 256 is used to input instructions from the user for the operation of the external controller 102. The display unit 254 is a display, for example, and is used to display information of an application being executed by the external controller 102 and an operation screen. The network I/F 255 is connected to the client PC 103 via the external LAN 104 and is used to communicate data such as a printing instruction and the like. The network I/F 257 is connected to the image forming apparatus 101 via the internal LAN 105 and is used to communicate data such as a printing instruction and the like. The external controller 102 is configured to communicate with the printing unit 107, the diagnosis unit 108, the stacker 109, and the finisher 110 via the internal LAN 105 and the communication cable 260. The video I/F 258 is connected to the image forming apparatus 101 via the video cable 106 and is used to communicate data such as image data (print data) and the like.

The client PC 103 includes a CPU 261, a memory 262, an HDD unit 263, a display unit 264, a keyboard 265, and a network I/F 266. These devices are connected to one another in a manner allowing for the exchange of data via a system bus 269. The CPU 261 executes a program stored in the HDD unit 263 to control the operations of each device via the system bus 269. In this manner, the various types of processing are implemented by the client PC 103. For example, the CPU 261 executes a document processing program stored in the HDD unit 263 to generate print data and send a printing instruction. The memory 262 stores programs and data required for when the CPU 261 executes various types of processing. The memory 262 operates as the working area of the CPU 261.

The HDD unit 263 stores various types of applications such as a document processing program, programs such as a printer driver, and various types of data. The display unit 264 is a display, for example, and is used to display information of an application being executed by the client PC 103 and an operation screen. The keyboard 265 is used to input instructions from the user for the operation of the client PC 103. The network I/F 266 is communicatively connected to the external controller 102 via the external LAN 104. The CPU 261 communicates with the external controller 102 via the network I/F 266.

In the configuration example illustrated in FIG. 1, the external controller 102 is connected to the image forming apparatus 101. However, the present embodiment is also applicable to configurations other than this. For example, the image forming apparatus 101 may be connected to the external LAN 104, and print data may be transmitted to the image forming apparatus 101 from the client PC 103 bypassing the external controller 102. In this case, the data analysis and interpretation and rasterization of the print data is executed by the image forming apparatus 101.

Image Diagnosis Processing

Figure 7:
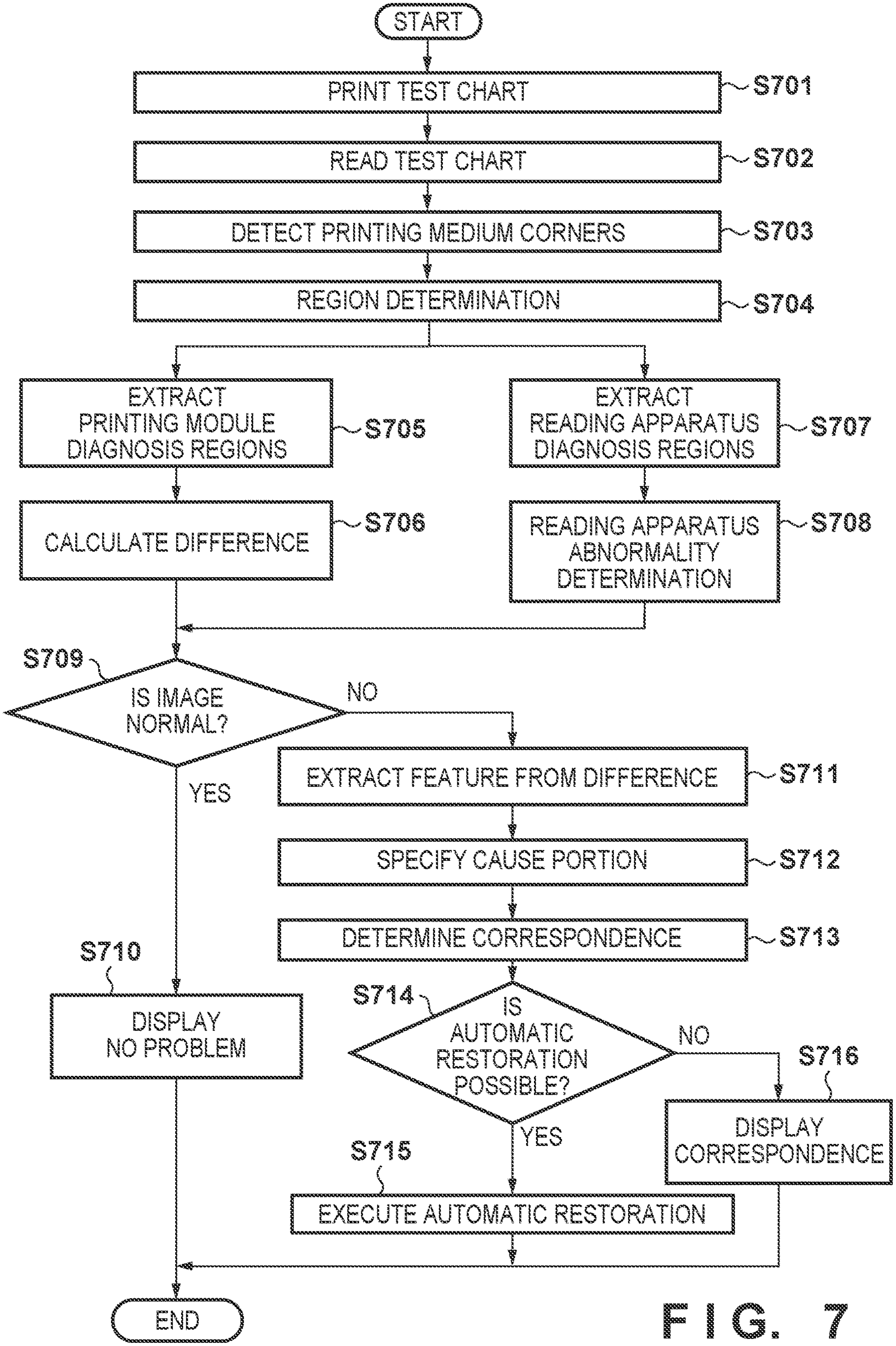
FIG. 7 is a flowchart illustrating a process of image diagnosis processing according to an embodiment.

Next, the print operation executed by the printing unit 107 and the process of the image diagnosis processing executed by the diagnosis unit 108 according to the present embodiment will be described with reference to FIG. 7. Note that FIG. 7 illustrates the overall flow from a task before the start of image diagnosis to diagnosis execution. The symbol "S" used in the description of the flowchart represents the term "step", and this also applies to other descriptions of flowcharts below. The processing described below is implemented by the CPU 206 of the printing unit 107 and the CPU 214 of the diagnosis unit 108 each reading out a program stored in the ROM or HDD to the RAM and executing the program.

First, in S701, when an instruction for image diagnosis is received from a user or a serviceman via the UI display unit 241 also functions as an operation unit, for example, the CPU 214 of the diagnosis unit 108 starts image diagnosis processing. The CPU 251 of the external controller 102 receives the start of image diagnosis processing from the diagnosis unit 108, reads out a prestored test chart and rasterizes it into a bitmap, and generates the bitmap obtained by rasterizing the test chart as a reference image. The test chart is an image for diagnosing an abnormality in the image forming apparatus 101 (hereinafter, may also be referred to as a test image).

Figure 8:
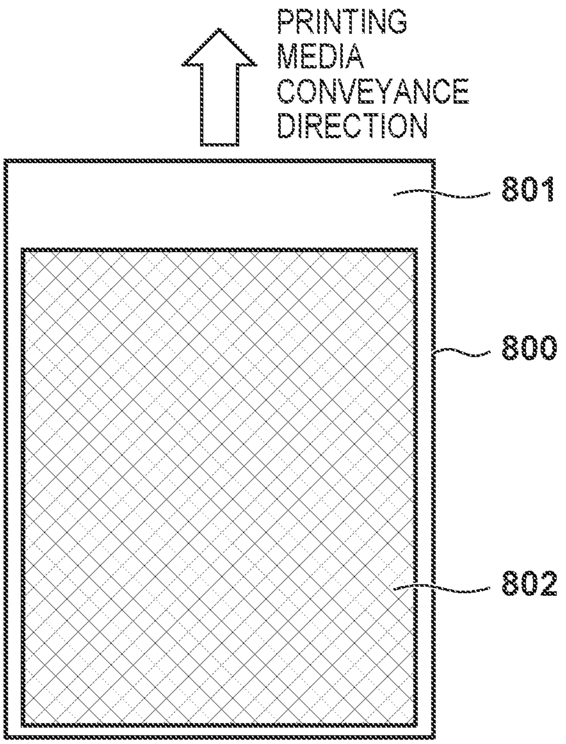
FIG. 8 is a diagram illustrating an example of a test chart used in the image diagnosis processing according to an embodiment.

FIG. 8 illustrates an example of a test chart used in image diagnosis processing according to the present embodiment. A test chart 800 includes a non-image portion 801, which is a non-image region, and an image portion 802, which is an image region. The non-image portion 801 indicates a region located at the leading end portion of the test chart 800 in the conveyance direction where no image is formed. Note that a non-image portion may be provided at the side end portion or the trailing end portion of the test chart. The image portion 802 indicates a region located not at the leading end portion of the test chart 800 in the conveyance direction where an image is formed with color material. The image portion 802, for example, uses an image with a single-color area ratio of 100% and prints a total of four test charts, each one a single color of CMYK. In other words, the test chart according to the present embodiment includes an image formed using a toner of a single color from among toners of a plurality of colors.

Now we will return to the description of FIG. 7. The CPU 251 transmits the bitmap data of the test chart obtained via rasterization from the video I/F 258 to the video I/F 205 of the printing unit 107 via the video cable 106. The CPU 206 of the printing unit 107 executes halftone processing on the bitmap data of the test chart obtained by the video I/F 205, and the test chart is printed by the printing unit 203 on the basis of the post-halftone processing image data.

Next, in S702, the CPU 214 of the diagnosis unit 108 executes processing to read the printed test chart using the image reading units 331 and 332. The read image of the test chart is stored in the HDD unit 216 of the diagnosis unit 108 as a diagnosis image. When the diagnosis image is stored, the flow proceeds to S703.

In S703, the CPU 214 detects the pixel positions of the sheet corners (four corners) of the printing medium from the read image. The method for detecting sheet corners is not particularly limited, and an example includes a method of extracting a pixel region similar to a prestored sheet corner image via template matching and obtaining the centroid of the pixel region. Also, it is only required that the method can detect a sheet corner, and an intersection point of edges of an outermost corner extracted via Hough transform may be used as the sheet corner. Four pixel positions extracted as the sheet corners are stored in the HDD unit 216 of the diagnosis unit 108, and then the flow proceeds to S704.

In S704, for each pixel position included in the read image, the CPU 214 determines whether it is in an external region, a non-image portion, or an image portion and generates region determination data according to the determination result. Here, an external region refers to a region outside of the printing medium. A non-image portion refers to a non-marked region within the printing medium where no color material is printed. An image portion refers to a marked region within the printing medium where color material is printed. The region determination data is configured of a number of pixels similar to the read image and is generated as 2-bit data that can represent the three states, namely the external region, the non-image portion, and the image portion.

First, determining whether it is an external region or within the printing medium will be described. The method for determining in or out includes, for example, determining using a known crossing number algorithm on the basis of the number of crossings between a straight line drawn from the target pixel position toward the image end portion and a straight line forming a rectangle. In a case where the number of crossings is an even number, the CPU 214 determines that it is an external region and sets the data of the target pixel position of the region determination data to “0” to indicate an external region. In other cases, it is determined to be within the printing medium, and the flow proceeds to a determination of whether it is a non-image portion or an image portion. As with determining whether it is in or out of the printing medium, determining whether it is a non-image portion or an image portion is performed by the CPU 214 determining whether or not the target pixel position is in the rectangle of the image portion 802 in the printing medium.

The CPU 214 prestores the relative positional relationship between the sheet corners detected in S703 and the rectangle of the image portion 802 in the printing medium in the HDD unit 216 and obtains the pixel positions corresponding to the rectangle of the image portion 802 from the sheet corners. The processing after obtaining the rectangle will be omitted due to being similar to the in/out determining for the printing medium. In a case where the target pixel position is determined to be a non-image portion, the CPU 214 sets the data of the target pixel position of the region determination data to “1” to indicate a non-image portion. In a similar manner, in a case where it is determined as an image portion, the CPU 214 sets the data to “2”. Note that in the present embodiment described here, the relative positional relationship between the sheet corners and the rectangle of the image portion 802 in the printing medium is used, but no such limitation is intended. For example, within the printing medium of the read image, a rectangular region where the density information (hereinafter, referred to as read density) that can be obtained from the reading signal values changes by a certain amount or more may be obtained and determined as an image region.

The CPU 214 stores the region determination data generated in S714 in the HDD unit 216 of the diagnosis unit 108. When the region determination data is stored, the flow proceeds to S705 and S707. In S705 and S706, difference image data for determining whether there is an abnormality in the printing unit 107 is generated. Also, in S707 and S708, whether there is an abnormality in the image reading unit 331 is determined, and abnormal pixel position data indicating the abnormal pixel position in the image reading unit 331 is generated.

First, generating the difference image data for determining whether or not there is an abnormality in the printing unit 107 will be described. In S705, the CPU 214 obtains an average value Ave_w of the pixel values in the non-image portion 801 in the read image and an average value Ave_b of the pixel values in the image portion 802. Each average value is obtained using the region determination data generated in S704 and the read image. Specifically, on the basis of the region determination data, the CPU 214 finds the average of the signal values of the read image corresponding to the pixel positions determined to be the non-image portion 801 and takes this as the average value Ave_w. In a similar manner, the CPU 214 finds the average of the signal values of the read image corresponding to the pixel positions determined to be the image portion 802 and takes this as the average value Ave_b. The CPU 214 stores the obtained average values in the HDD unit 216, and the flow proceeds to S706.

In S706, the CPU 214 generates difference image data from the average values of the regions obtained in S705 and the read image. The CPU 214 uses the region determination data and the read image to determine a pixel to be within the printing medium in a case where the region determination data corresponding to the target pixel position of the read image is “1” (non-image portion” or “2” (image portion). Also, the CPU 214 compares the corresponding average value and the read image and obtains a difference value. In a case where the obtained difference value is greater than a preset threshold, the CPU 214 determines there to be a difference and sets the difference image data to “1”. In a case where the difference value is less than or equal to the threshold, the CPU 214 sets the difference image data to “0”. Note that the method for obtaining difference image data is not limited to the method of this example. In the present embodiment described here, an average value is obtained from the read image and used as a reference signal. However, an assumed value may be prestored in the HDD unit 216 as a reference signal. Alternatively, a correction unit may be provided for correcting nonlinearity between the signal values of the read image obtained by the image reading unit 331 and the brightness and may obtain the difference image data after correction of the signal values of the read image. The CPU 214 stores the difference image data, which is binary data indicating whether or not there is a difference, in the HDD unit 216, and the flow proceeds to S709.

Next, generating the difference image data for determining whether or not there is an abnormality in the image reading unit will be described. In S707, the CPU 214 obtains an average value Ave_back for the external region. The CPU 214 obtains the average value Ave_back using the region determination data generated in S704 and the read image. Specifically, on the basis of the region determination data, the CPU 214 finds the average of the signal values of the read image corresponding to the pixel positions determined to be the external region and takes this as the average value Ave_back. The CPU 214 stores the obtained average value in the HDD unit 216, and the flow proceeds to S708.

Figure 9:
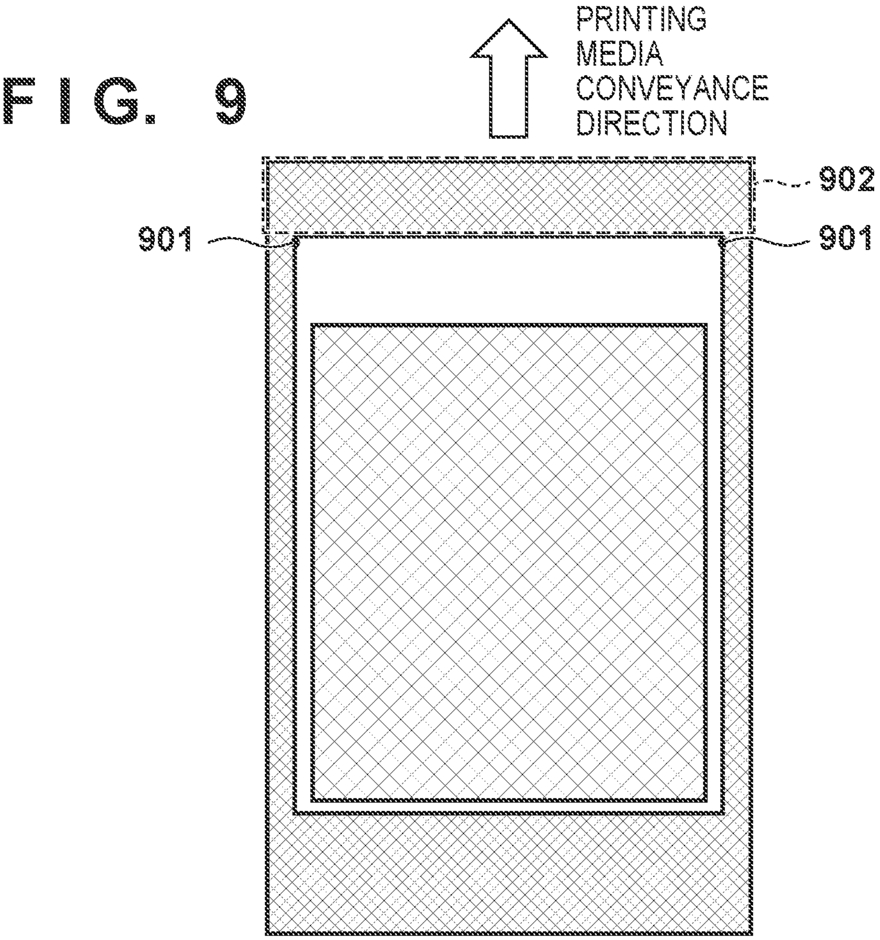
FIG. 9 is a schematic view illustrating the relationship between sheet corners and a diagnosis region according to an embodiment.

In S708, the CPU 214 extracts the external region located at the upper end beyond the sheet corners detected in S703 in the conveyance direction as the diagnosis region for diagnosing an abnormality in the image reading unit 331 and compares this with the average value for each main scanning position to generate abnormal pixel position data. The diagnosis region in the read image is schematically illustrated in FIG. 9. As illustrated in FIG. 9, using sheet corners 901 detected in S703 and the region determination data, the CPU 214 sets the region located up from the sheet corners 901 (the downstream side in the conveyance direction) determined to be an external region as a diagnosis region 902.

Figures 10A, 10B, 10C, 10D:
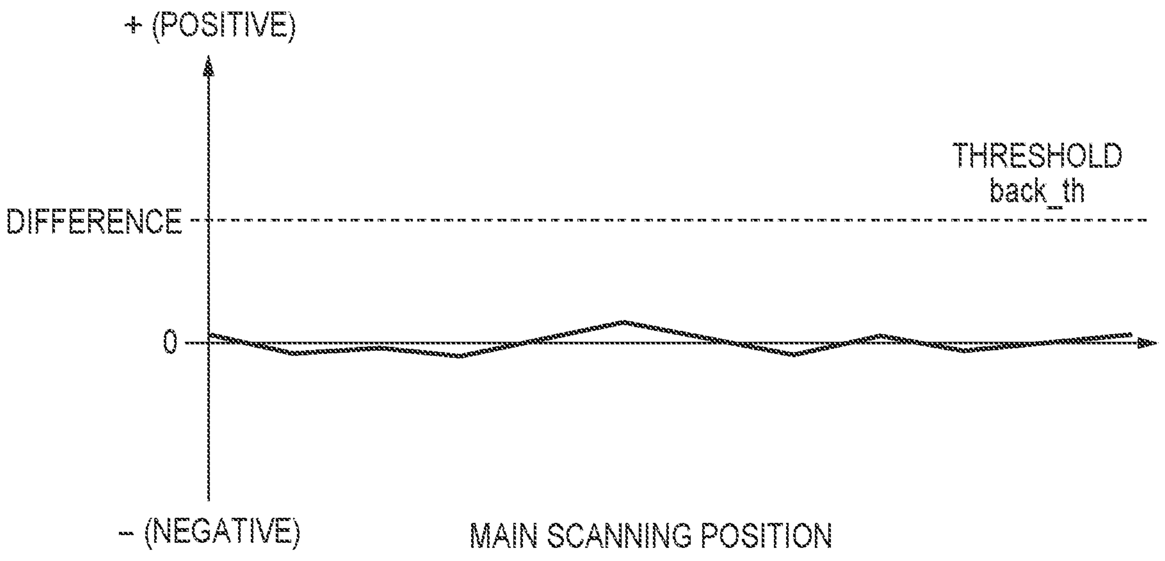
FIGS. 10A to 10D are schematic views illustrating a data conversion process until abnormal pixel position data is generated according to an embodiment.

The data conversion process for generating abnormal pixel position data from the diagnosis region will be now described with reference to FIGS. 10A to 10C. Note that each value in FIGS. 10A to 10C are simply examples and do not indicate the processing results described below. In the case of a 10×6 pixel diagnosis region such as that illustrated in FIG. 10A, the read signal values per main scanning position are averaged, and a 10×1 pixel average data group is obtained. An example of an average data group is illustrated in FIG. 10B. Then, each pixel value of the average data group is subtracted from the average value Ave_back obtained in S707 to obtain a difference data group. An example of a difference data group is illustrated in FIG. 10C. For example, if the average value Ave_back is "5", then a data group obtained by subtracting "5" from each pixel value of the average data group corresponds to the difference data group. Thus, the difference data group is stored as 8-bit data representing positive and negative values. Lastly, the difference data is compared with a preset threshold back_th. In a case where the difference data is greater than the threshold back_th, the abnormal pixel position data is set to "1" indicating an abnormal pixel. In a case where the difference data is equal to or less than the threshold back_th, the data is set to "0". For example, in the example illustrated in FIG. 10D, the difference data indicated by the solid line, is always equal to or less than the threshold back_th, and so all of the pixels are set to "0".

The threshold back_th is set to a value that allows reading noise to be sufficiently separated in a case where dirt or dust of different sizes or color has adhered to the image reading unit 331, and read images of when a read signal value error occurs due to a circuit abnormality are collected. Note that in the present embodiment described here, the threshold is set to a positive value. However, the setting of the threshold is not limited by this example. The threshold may be decided taking into account the brightness of the conveying path 330 which affects the read signal values of the external region, and in a case where white backing with a low read density is used in the conveying path, marks on the reading apparatus may cause the read signal value to be lower than those of the surroundings. In such cases, the threshold may be set to a negative value.

Figure 11A:
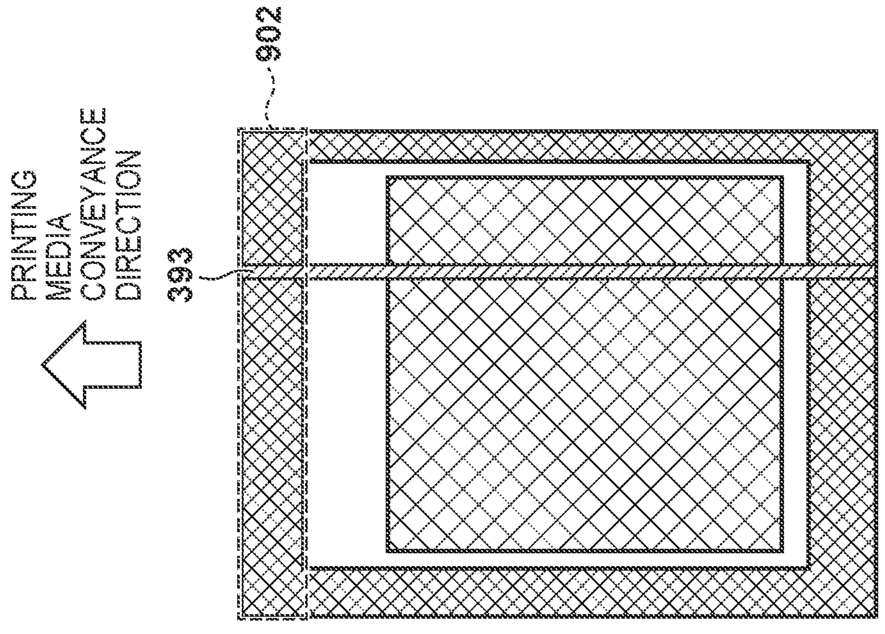
FIGS. 11A and 11B are schematic views illustrating a read image in a state with an abnormality in the image forming apparatus and difference data of a diagnosis region according to an embodiment.
Figure 11B:
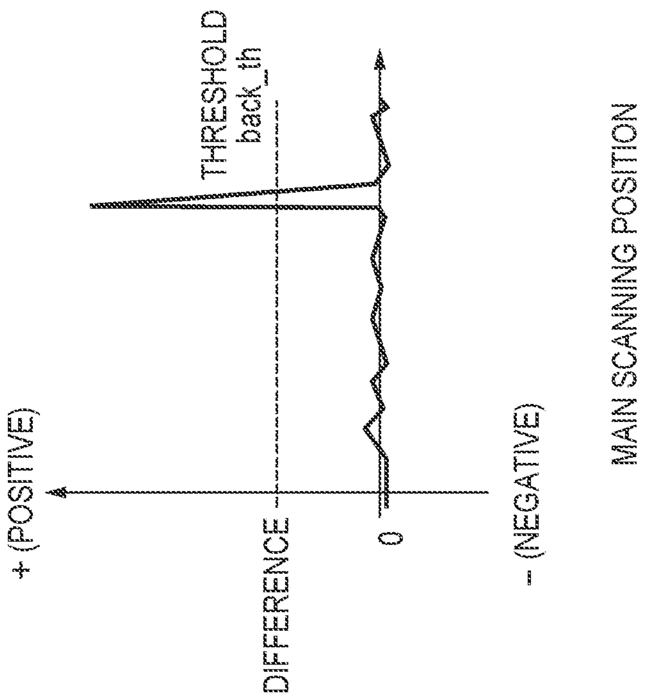

In FIGS. 9 and 10A to 10D described above, an abnormal pixel is not included in the image reading unit 331. On the other hand, FIGS. 11A and 11B illustrate an example where an abnormal pixel is included in the image reading unit 331. FIG. 11A illustrates an example of a read image. As illustrated in FIG. 11A, in the diagnosis region (external region) 902, the streak 393 has occurred with a read signal value greater than the surroundings due to a mark on the reading glass. Thus, when the processing described above is executed and the difference data group is obtained, as illustrated in FIG. 11B, the difference data is greater than the threshold back_th at a region corresponding to the streak 393, and this is detected as an abnormal pixel position.

Figure 12A:
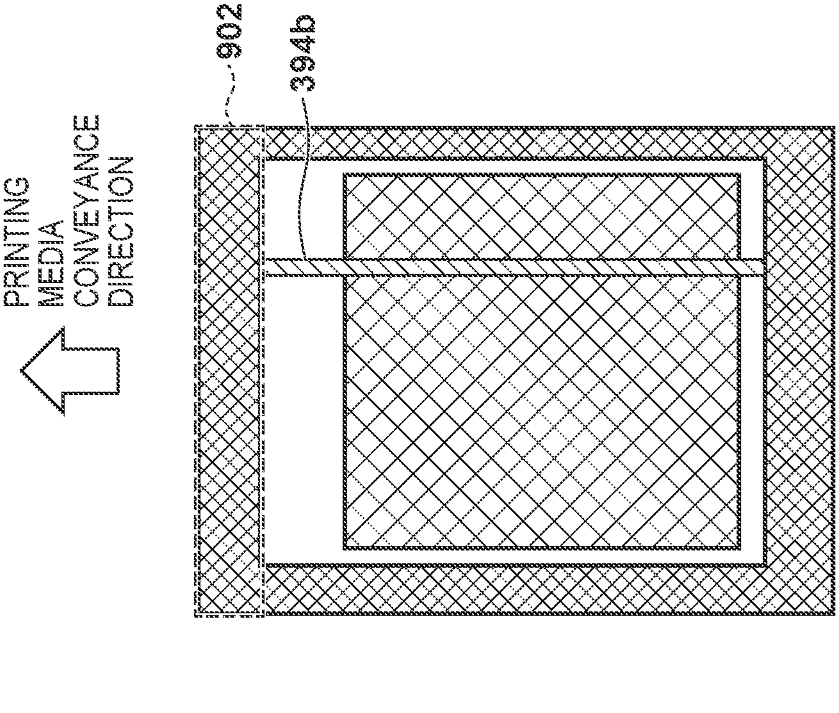
FIGS. 12A and 12B are schematic views illustrating a read image in a state with a mark on a printing medium and difference data of a diagnosis region according to an embodiment.
Figure 12B:
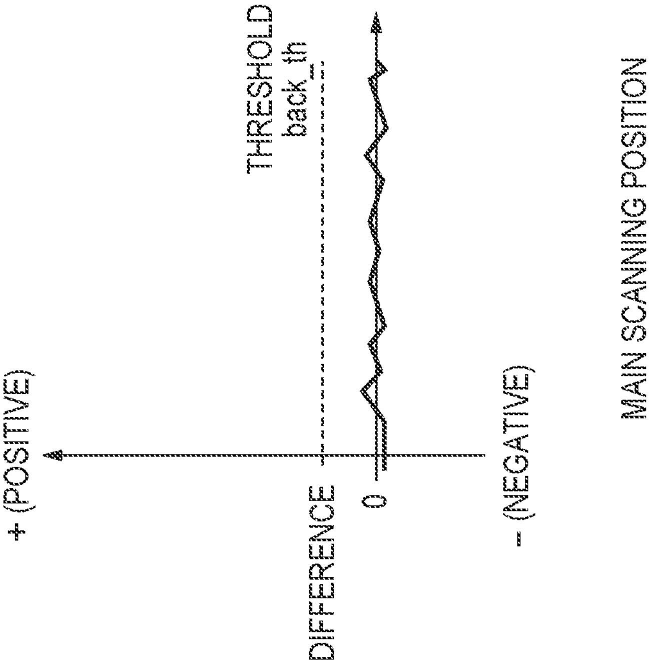

On the other hand, FIG. 12 illustrates an example where a print mark 394*b* is adhered to the printing medium 391. FIG. 12A illustrates an example of a read image. As illustrated in FIG. 12A, the diagnosis region 902 is an external region located outside of the printing medium 391 and thus is not affected by the print mark 394*b*. Accordingly, the threshold is not exceeded when obtaining the difference data using similar processing. In other words, an erroneous determination of an abnormal pixel in the image reading unit 331 is not made due to a print mark. In a case where upon executing the processing described above, an abnormal pixel position greater than the threshold back_th is found, binary abnormal pixel position data including "1" is generated.

Now we will return to the description of FIG. 7. The CPU 214 stores the generated abnormal pixel position data in the HDD unit 216, and the flow proceeds to S709. When the generation of the difference image data and the abnormal pixel position data is complete, in S709, the CPU 214 determines whether or not the image forming apparatus 101 is functioning normally. Whether or not data including "1" exists in the difference image data or the abnormal pixel data is determined. In a case where the CPU 214 obtains a determination result of normal for the image forming apparatus 101 (YES in S709), the processing moves to S710. In S710, the CPU 214 displays a diagnostic result of "no problem" indicating normal for the diagnostic result on the UI display unit 241 of the diagnosis unit 108, and the processing of the present flowchart ends.

On the other hand, in a case where the CPU 214 obtains a determination result of not normal (the difference image data or the abnormal pixel position data includes "1") for the image forming apparatus 101 (NO in S709), the processing moves to S711. In S711 to S716, on the basis of the read image data, the difference image data, and the abnormal pixel position data, a portion (part) where an abnormality has occurred in the image forming apparatus 101 is specified, and control instructing for action is performed.

In S711, the CPU 214 extracts the feature amount for specifying the abnormal portion (part) of the printing unit 107 using the read image data and the difference image data. The CPU 214 performs difference feature extraction using the read image corresponding to the difference region determined to "have a difference" obtained by the difference image data in S706. Examples of the feature information of the difference region obtained via this extraction processing include color information of what color from among yellow, magenta, cyan, and black will appear, contrast information indicating the density of the abnormality, and shape information indicating size or a vertically long shape, and the like. Other examples include coordinate information indicating the position in a direction perpendicular to the conveyance direction of the test chart in the printing unit 107, period information indicating the periodic appearance of abnormalities with similar features in the conveyance direction of the test chart in the printing unit 107, and the like.

Next, in S712, the CPU 214 specifies the portion (part) which is the cause of the image abnormality in the printing unit 107 and the image reading unit 331 on the basis of the feature information of the difference region obtained in S709. First, the CPU 214 determines whether or not the abnormal pixel position data includes "1" indicating an abnormal pixel. In a case where "1" is included, it is specified that there is an abnormality in the image reading unit 331. Also, on the basis of the feature amount obtained in S711, to remove the difference region due to the abnormality of the image reading unit 331 from the difference region, the CPU 214 excludes the difference region including the main scanning position determined to be an abnormal pixel from the portion-specifying. The CPU 214 selects, from among the excluded difference regions, a combination with a high similarity in the same color and specifies which portion the abnormality is in from the period information of the selected combination.

In S713, the CPU 214 determines the action to take for the image abnormality on the basis of the abnormal portion that is the cause as specified in S712. The action to take is divided into automatic restoration action and non-automatic restoration action. Automatic restoration action includes, for example, restoration action that can be automatically performed by the printing unit 107 such as cleaning the wire or grid of the corona charging device, which is a charging unit of the photosensitive drum provided in the image forming stations 304 to 307 of the printing unit 107. Non-automatic restoration action includes, for example, action requiring a user to perform a task such as cleaning off a mark on the reading glass surface of the image reading units 331 and 332 of the diagnosis unit 108, adjusting the printing medium being used, and the like. Other examples of a non-automatic restoration action include action requiring a serviceman to purpose a task such as replacing the portion (part), action relating to the read abnormality of the image reading unit or a fiber or a foreign substance in the printing medium before image formation is performed, and the like.

Next, in S714, the CPU 214 determines whether or not the action determined in S713 is an automatic restoration action. In a case where the CPU 214 obtains a determination result that the determined action is an automatic restoration action (YES in S714), the processing moves to S715. In S715, the CPU 214 executes automatic restoration control corresponding to the cause of the image abnormality, and the processing of the present flowchart ends.

On the other hand, in a case where the CPU 214 obtains a determination result that the determined action is not an automatic restoration action (NO in S714), the processing moves to S716. In S716, the CPU 214 displays the image diagnosis result and the corresponding method on the UI display unit 241 of the diagnosis unit 108, and the processing of the present flowchart ends.

As described above, a diagnostic apparatus according to the present embodiment diagnoses an abnormal portion of the image forming apparatus. The present diagnostic apparatus extracts a diagnosis region for specifying an abnormal portion from a read image obtained by a reading unit reading a printing medium conveyed along a conveying path from an image forming unit. Also, the present diagnostic apparatus determines an abnormality in the extracted diagnosis region and specifies an abnormal portion on the basis of the determination result. The diagnosis region described above includes an external region, which is a region outside the printing medium of the read image. In this manner, according to the present embodiment, the external region located outside of the printing medium 391 included in the read image for diagnosis is extracted as a diagnosis region, and an abnormal portion of the image reading unit 331 is diagnosed by determining whether or not there is a streak in the external region. Accordingly, by setting the external region which is not affected by the printing unit 107 as the diagnosis region, the accuracy of diagnosing an abnormality of the image reading unit can be improved. Note that the image reading unit 331 is used in the example described above. However, it should be obvious that by printing the test chart on the back surface of the printing medium 391, a similar effect for the image reading unit 332 can be implemented.

Modified Example of First Embodiment

In the first embodiment described above, a test chart is used as an image to be printed on the printing medium 391. However, the image to be printed is not limited to this example. For example, image data instructed to be subjected to a printing processing by a user may be used as an image to be printed, and image diagnosis may be performed using the printing medium 391 on which an image designated by the user is printed. For example, during image diagnosis processing, by adding RIP analysis processing for analyzing a RIP image and specifying the non-image portion and the image portion using the amount of color material at each pixel position included in the RIP image, a similar effect can be obtained with image diagnosis using a user-designated image. In this manner, by using a printing medium printed with a user-designated image, image diagnosis processing can be performed in parallel during a printing task.

Second Embodiment

The second embodiment of the present invention will be described below. In the first embodiment described above, an external region is used as a diagnosis region when executing image diagnosis processing. However, the present invention is not limited to only this embodiment. When the threshold back_th is set to a value that can sufficiently be separated from reading noise and an abnormality in the image reading unit 331 is in a minor state, the difference data may be less than the threshold back_th and the abnormality may not be detected. Regarding this, in the present embodiment described here, in addition to the external region, a region with a different read density to the external region is also used as the diagnosis region. In other words, by expanding the diagnosis region to a plurality of portions, diagnosis is possible from even a state where the abnormality in the image reading unit 331 is very minor. Having a different read density here refers to regions with density information that can be obtained from read signal values that differ by a predetermined value or greater across the regions. In other words, read density refers to the density value of a predetermined region. For density value, any value such as the average value in the region, the median value, the modal value, or the like may be used. Note that the configuration and control of the image forming system according to the present embodiment is similar to that of the first embodiment and thus will not be described. Here, the processing of S707 and S708 of the image diagnosis processing that differs from the first embodiment will be described.

In S707, the CPU 214 obtains the average value Ave_back of the external region and an average value Ave_inv of a region with a different read density to the external region.

Figure 13A:
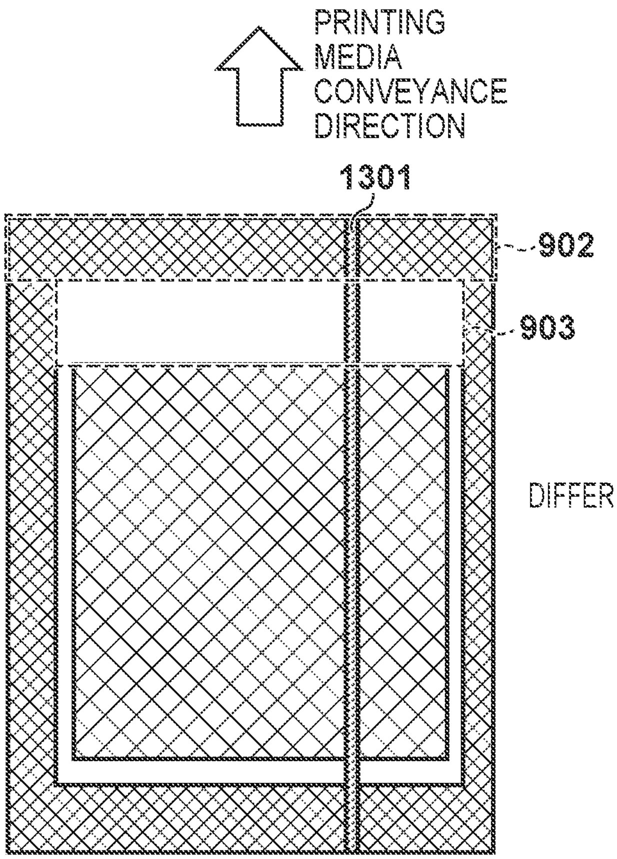
FIGS. 13A to 13C are schematic views illustrating a diagnosis region and difference data of the diagnosis region according to an embodiment.
Figure 13B:
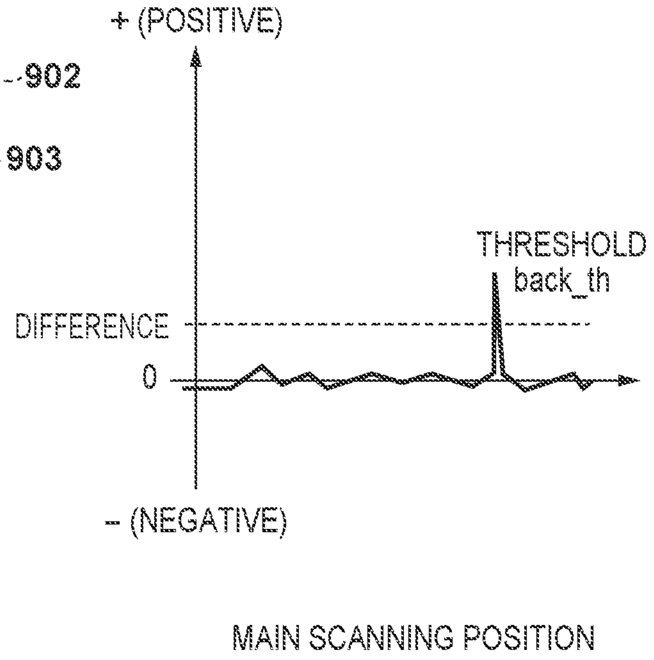
Figure 13C:
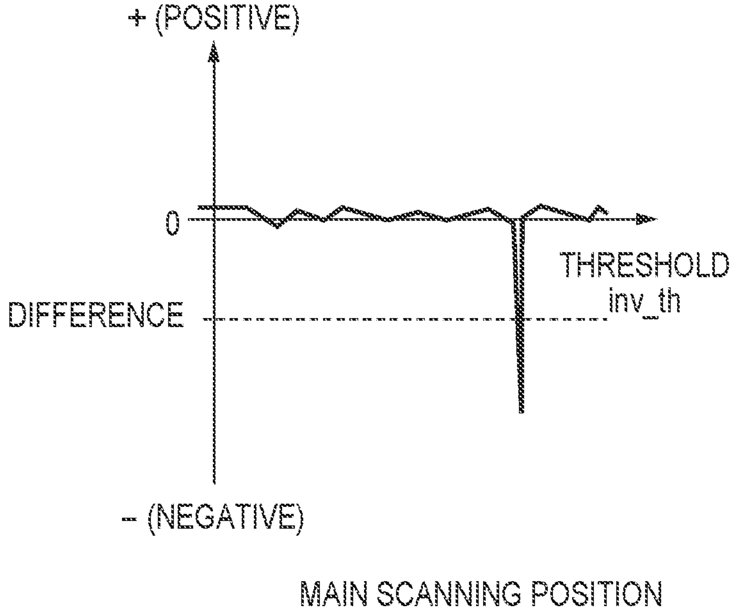

The method for obtaining the average value Ave_back is similar to that in the first embodiment, and thus the description thereof is omitted. On the basis of the reflectance of the conveying path 330 relating to the read density of the external region, the read density of the region for which the average value Ave_inv is obtained is set in advance. In the present embodiment described below, in a case of black backing with a high read density for the conveying path 330, the non-image portion 801 is used as the region for obtaining the average value Ave_inv. FIGS. 13A to 13C schematically illustrate the diagnosis region according to the present embodiment. In the present embodiment, as illustrated in FIG. 13A, in addition to the diagnosis region 902 of the external region, a diagnosis region 903 of a non-image portion with a different read density to the external region is used. The CPU 214 extracts the non-image portion (903) on the upper end in the conveyance direction on the basis of the sheet corners detected in S703 and the relative positional relationship between the rectangle of the image portion 802 in the printing medium prestored in the HDD unit 216 and the sheet corners. Also, the CPU 214 obtains the average value Ave_inv on the basis of the read signal values of the read image corresponding to the extracted non-image portion (903). Furthermore, when the CPU 214 obtains the average value Ave_inv and stores it in the HDD unit 216, the processing moves to S708.

In S708, the CPU 214 obtains an abnormal pixel position candidate of the diagnosis region with a different read density to the external region in addition to an abnormal pixel position candidate corresponding to the external region as in the first embodiment. The method for obtaining an abnormal pixel position is similar regardless of the diagnosis region, and thus the description thereof will be omitted. The difference is in the threshold that is set. FIG. 13B illustrates the relationship between the difference data of the diagnosis region 902 of the external region and the threshold back_th. The threshold back_th is as is described above in the first embodiment, and thus the description thereof is omitted.

Also, FIG. 13C is a diagram of the relationship between the difference data of a diagnosis region with a different read density to the external region and a threshold inv_th. To obtain abnormal pixel position data of the diagnosis region with a different read density to the external region, the CPU 214 collects in advance a read image in the case of a read signal value error occurring due to a circuit abnormality in the case of dirt or dust of different sizes or color has adhered to the image reading unit 331. Also, as illustrated in FIG. 13C, the CPU 214 sets the value that can be sufficiently separated from the reading noise in the non-image portion as the threshold inv_th. Then, in a case where the data is less than the threshold inv_th in a diagnosis region with a different read density to the external region, the CPU 214 selects it as an abnormal pixel position candidate.

A factor in setting the thresholds (back_th and inv-th) in different read density directions as described above will now be described. A case of an abnormal pixel in the image reading unit 331 may be caused by a mark on the reading glass. When there is a mark between the image reading unit 331 and the printing medium 391, a small amount of light reflecting off the mark at a region with high read density such as the external region may change the read signal value at the abnormal pixel position of the read image to a brighter signal value. On the other hand, in a region with a low read density such as the non-image portion, compared to the slight increase in light reflected from the mark, the decrease in light that should reflect from the printing medium 391 is greater, causing a shadow that makes the abnormal pixel obvious. In other words, there is a feature where the same abnormal pixel will appear bright at the abnormal pixel position in a region with a high read density and will appear dark in a region with low read density. To detect this feature, in the present embodiment, a threshold is set differently for diagnosis regions with different read densities.

Also, in a case where the selected two types of abnormal pixel positions are the same main scanning position in the read image data, the CPU 214 determines that there is an abnormality in the image reading unit 331 and sets the abnormal pixel data to "1". In a case where abnormality candidates of the same main scanning position are not selected, the CPU 214 sets the data to "0" without an abnormal pixel determination.

As described above, the diagnostic apparatus according to the present embodiment, in addition to the configuration according to the first embodiment, extracts, from a read image, a non-image region in the printing medium where an image is not formed as a diagnosis region. In this manner, according to the present embodiment described above, an external region and a non-image portion with a different read density to the external region are extracted, and an abnormal portion of the image reading unit 331 is diagnosed on the basis of the characteristics of a streak in each diagnosis region. By adding a region with a different read density to the external region to the diagnosis region, diagnosis can be performed using smaller abnormalities.

Modified Example of Second Embodiment

Figure 14A:
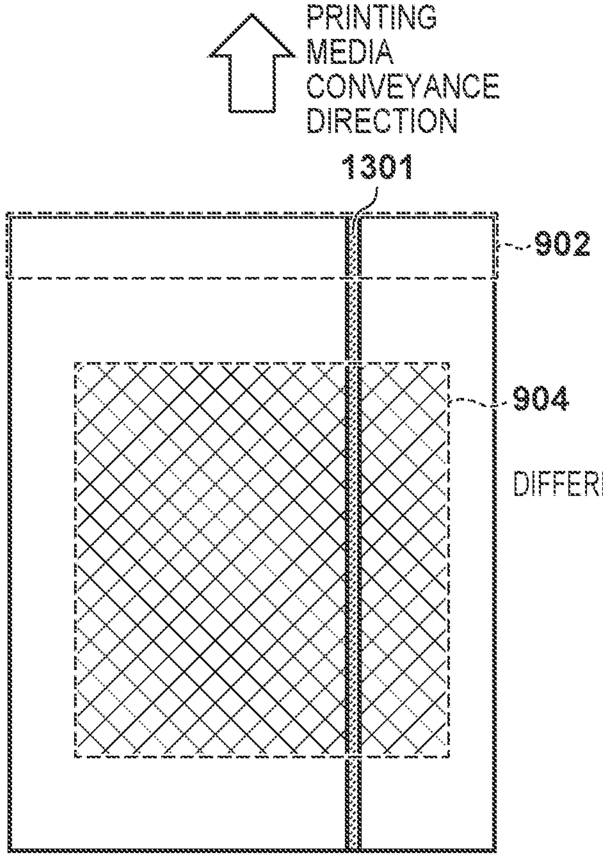
FIGS. 14A to 14C are schematic views illustrating a diagnosis region of a low read density external region and difference data of the diagnosis region according to an embodiment.
Figure 14B:
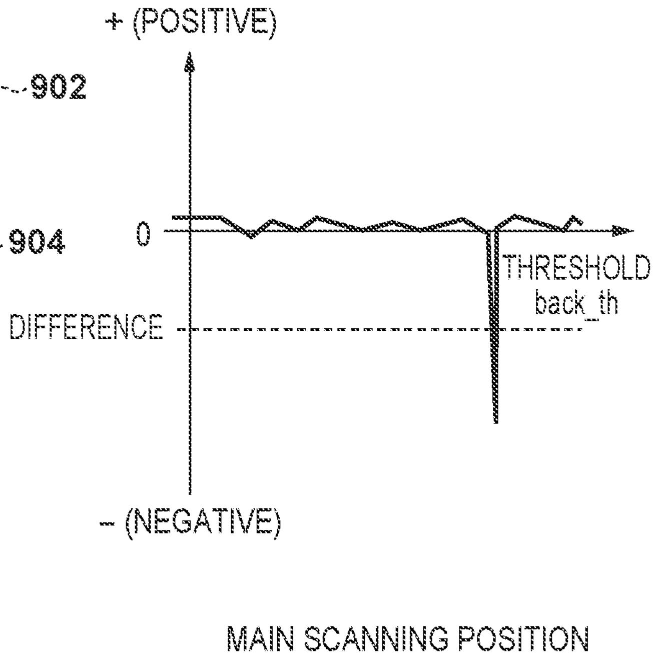
Figure 14C:
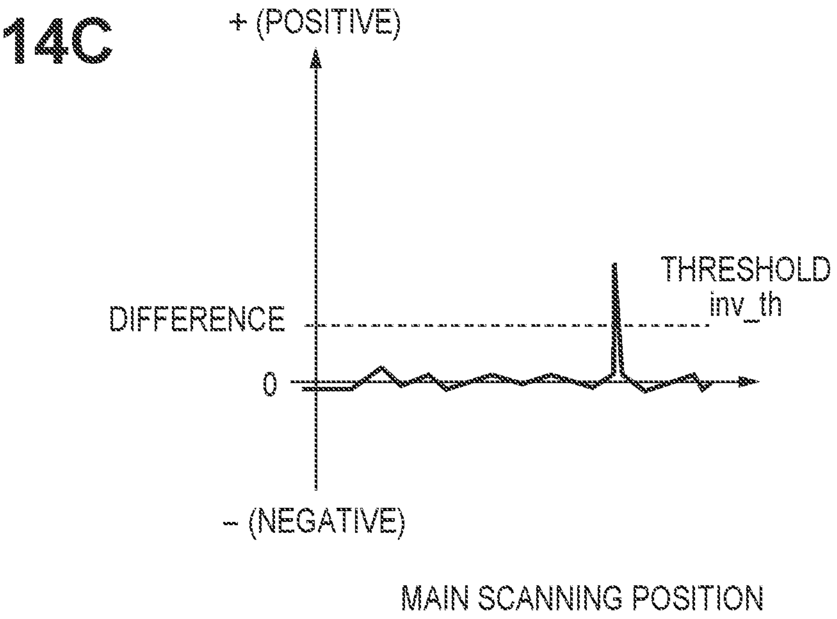

In the second embodiment described above, black backing with a high (dark) read density is used in the external region. However, the read density of the external region is not limited to this example. White backing with a low (bright) read density may be used. FIGS. 14A to 14C schematically illustrate a diagnosis region in a case where white backing is used as the external region. In the case of using white backing, as illustrated in FIG. 14A, in addition to the diagnosis region 902 of the external region, an image portion with a high read density is extracted as a diagnosis region 904. Upon extraction, as in the present embodiment, different thresholds are set for each density, and each abnormal pixel position candidate is obtained. FIG. 14B illustrates the relationship between the difference data of the diagnosis region 902 and the threshold. FIG. 14C illustrates the relationship between the difference data of the image portion (904) with a high read density and the threshold. As illustrated in FIGS. 14B and 14C, in a case where abnormal pixel position candidates at the same main scanning position in the read image data are selected, an abnormal pixel is determined.

In this manner, by changing the feature of the region added as a diagnosis region via the read density of the external region, the target region capable of improving the accuracy of diagnosing an abnormality in the image reading unit 331 can be enlarged. Also, in the present embodiment described above, two types of diagnosis regions, namely an external region and a region with a different read density to the external region, are used. However, no such limitation is intended to the present invention. For example, a plurality of types of regions with different read densities to the external region may be prepared, and diagnosis regions of two or more of the types may be extracted. Even in a case where diagnosis regions of two or more types are extracted, in a similar manner, a threshold is set for each region, an abnormal pixel position candidate is selected for each region, and an abnormal pixel is determined if the abnormal pixel position candidates are all of the same main scanning position.

Third Embodiment

The third embodiment of the present invention will be described below. In the first and second embodiment described above, an external region is included as a diagnosis region when executing image diagnosis processing. However, with products with installed memory of a small size, it is desirably to make the memory region for storing a read image small, that is, the external region is desirably set to a minimum. In the present embodiment described here, a read image with a minimum external region is used. In the present embodiment described here, the external region is not used as a diagnosis region, and a plurality of regions with different read densities in the printing medium 391 are used as the diagnosis region. Note that the configuration of the image forming system and the image diagnosis processing process according to the present embodiment are similar to that of the first and second embodiment and thus will not be described. Here, the processing of S707 and S708 of the image diagnosis processing that differs from the first and second embodiment will be described.

Figure 15A:
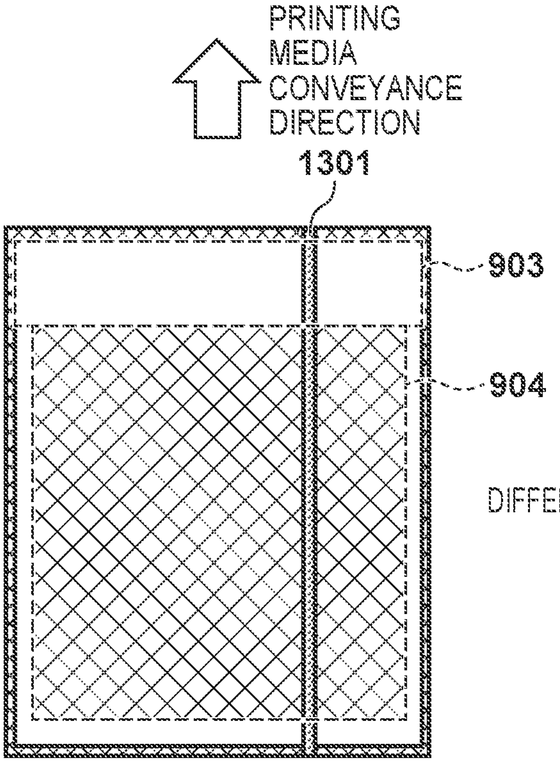
FIGS. 15A to 15C are schematic views illustrating a read image in a state with an abnormality in the image forming apparatus and difference data of the diagnosis region according to an embodiment.
Figure 15B:
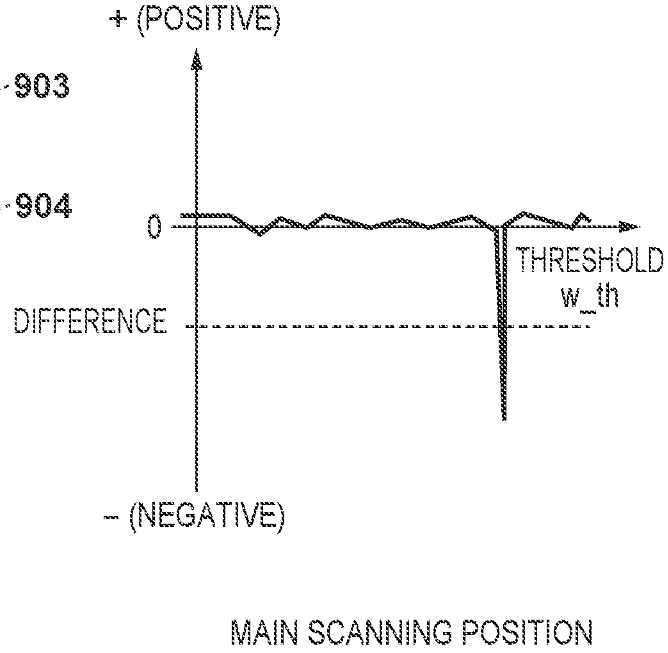
Figure 15C:
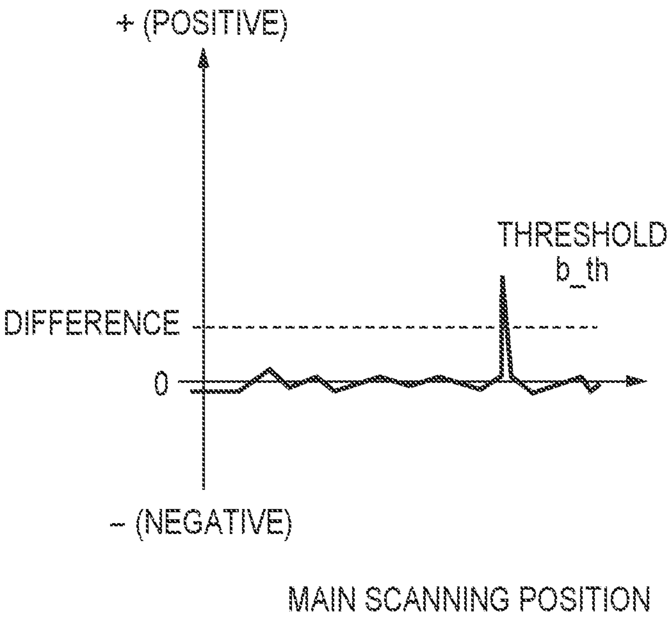

In S707, the CPU 214 obtains the average value Ave_w of the non-image portion and the average value Ave_b of the image portion. FIGS. 15A to 15C schematically illustrate the diagnosis region according to the present embodiment. As illustrated in FIG. 15A, the read image according to the present embodiment is set with a very narrow external region outside of the printing medium 391 compared to the first and second embodiment. By reducing the size of the read image, the memory resources can be effectively used. The CPU 214 extracts the diagnosis region 903 of the non-image portion on the upper end in the conveyance direction on the basis of the coordinates of the sheet corners detected in S703 and the relative positional relationship between the rectangle of the image portion 802 within the printing medium prestored in the HDD unit 216 and the sheet corners. Also, the CPU 214 obtains the average value Ave_w on the basis of the signal values of the read image corresponding to the diagnosis region 903 of the extracted non-image portion. In a similar manner, the CPU 214 extracts the image portion 904 on the basis of the coordinates of the sheet corners and the relative positional relationship between the rectangle of the image portion 802 within the printing medium prestored in the HDD unit 216 and the sheet corners. Also, the CPU 214 obtains the average value Ave_b on the basis of the signal values of the read image corresponding to the diagnosis region 904 of the extracted image portion.

Note that each of these diagnosis regions is an example, and no limitation is intended. In other words, it is sufficient that printing density unevenness of the printing unit 107 and unevenness of the printing medium 391 itself is suppressed and the region size is sufficient for an average value to be obtained. In the diagnosis region 903 of the non-image portion, an average value may be obtained from the overall non-image portion in the printing medium 391 and not just from the upper end in the conveyance direction. In a similar manner, in the diagnosis region 904 of the image portion, an average value may be obtained from one or more regions and not from the overall image portion in the printing medium 391. More preferably, this can be configured to be changeable depending on the engine state of the printing unit 107 or the basis weight of the printing medium 391. When the CPU 214 obtains the average values Ave_w and Ave_b and stores it in the HDD unit 216, the processing proceeds to S708.

In S708, the CPU 214 obtains an abnormal pixel position candidate corresponding to the diagnosis region 904 of the image portion in addition to an abnormal pixel position candidate corresponding to the diagnosis region 903 of the non-image portion. The method for obtaining the abnormal pixel position is similar to that in the first and second embodiment, and thus the description thereof is omitted. As in the first and second embodiment, different thresholds are set for each diagnosis region.

FIGS. 15B and 15C are diagrams illustrating the relationship between the difference data of each diagnosis region and the threshold. FIG. 15B illustrates the relationship between the difference data of the diagnosis region 903 of the non-image portion and the threshold. The abnormal pixel position candidate corresponding to the diagnosis region 903 of the non-image portion is selected as an abnormal pixel position candidate if the data is less than the threshold w_th. FIG. 15C illustrates the relationship between the difference data of the diagnosis region 904 of the image portion and the threshold. The abnormal pixel position candidate corresponding to the diagnosis region 904 of the image portion is selected as an abnormal pixel position candidate if the data is greater than the threshold b_th. As illustrated in FIGS. 15B and 15C, in a case where abnormal pixel position candidates at the same main scanning position in the read image data are selected, an abnormal pixel is determined.

As described above, a diagnostic apparatus according to the present embodiment diagnoses an abnormal portion of the image forming apparatus. The present diagnostic apparatus extracts a diagnosis region for specifying an abnormal portion from a read image obtained by a reading unit reading a printing medium conveyed along a conveying path from an image forming unit. Also, the present diagnostic apparatus determines an abnormality in the extracted diagnosis region and specifies an abnormal portion on the basis of the determination result. The diagnosis region includes at least two types of regions in the read image with different read densities. In the example described above, in the printing medium 391, a non-image portion and an image portion are extracted as the plurality of diagnosis regions with different read densities and an abnormal portion of the image reading unit 331 is diagnosed on the basis of the characteristics of a streak in each diagnosis region. This allows the detection accuracy of abnormalities in the image reading unit 331 to be improved while reducing the memory area and processing cost.

Modified Example of Third Embodiment

In the third embodiment described above, two types of regions with different read densities in the printing medium 391 are used as the diagnosis regions.

However, the number of diagnosis regions is not limited to this example. For example, in the printing medium 391, three or more types of diagnosis regions may be extracted. Even in a case where diagnosis regions of three or more types are extracted, a threshold may be set for each region, an abnormal pixel position candidate is selected for each region, and an abnormal pixel may be determined if the abnormal pixel position candidates are all of the same main scanning position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-025526, filed Feb. 21, 2023, which is hereby incorporated by reference herein in its entirety.

What is claimed is:

1. A diagnostic apparatus for diagnosing an abnormal portion of an image forming apparatus, comprising:

at least one memory device that stores a set of instructions; and at least one processor that executes the set of instructions to extract diagnosis regions for specifying the abnormal portion from a read image obtained by a reading unit reading a printing medium conveyed along a conveying path from an image forming unit, determine an abnormality in the extracted diagnosis regions, and specify the abnormal portion on a basis of a result of the determination, wherein the diagnosis regions include an external region which is a region outside the printing medium of the read image, and a region in the printing medium having a read density different from a read density of the external region, wherein the at least one processor further executes instructions in the memory device to:

obtain a first abnormal pixel position candidate in the external region using a first threshold, and obtain a second abnormal pixel position candidate in the region in the printing medium using a second threshold different from the first threshold, and specify the reading unit as the abnormal portion in a case where the first abnormal pixel position candidate and the second abnormal pixel position candidate are at a same main scanning position in the read image.

2. The diagnostic apparatus according to claim 1, wherein the at least one processor executes instructions in the memory device to:

specify the reading unit as the abnormal portion in a case where there is an abnormality in the external region extracted as the diagnosis regions.

3. The diagnostic apparatus according to claim 2, wherein the at least one processor executes instructions in the memory device to:

obtain four corners of the printing medium included in the read image and extract a region outside of a region defined by the four corners as the external region.

4. The diagnostic apparatus according to claim 3, wherein the at least one processor executes instructions in the memory device to:

extract, from the read image, a non-image region in the printing medium where an image is not formed and with a different read density to the external region as the diagnosis regions.

5. The diagnostic apparatus according to claim 3, wherein the at least one processor executes instructions in the memory device to:

extract, from the read image, an image region in the printing medium where an image is formed and with a different read density to the external region as the diagnosis regions.

6. The diagnostic apparatus according to claim 3, wherein the at least one processor executes instructions in the memory device to:

the external region in the read image is a region obtained by the reading unit reading the conveying path.

7. The diagnostic apparatus according to claim 3, wherein the at least one processor executes instructions in the memory device to:

the external region is a region of the read image at an upper end in a direction in which the printing medium is conveyed along the conveying path.

8. The diagnostic apparatus according to claim 3, wherein a test chart is formed by the image forming unit on the printing medium using toner of one color from among toner of a plurality of colors, and the at least one processor executes instructions in the memory device to:

extract an image region and a non-image region of the test chart to specify an abnormality of the image forming unit.

9. The diagnostic apparatus according to claim 3, wherein the at least one processor executes instructions in the memory device to:

obtain an average value of read signals of each region extracted as the diagnosis regions from the read image and determine a pixel with a difference value between a pixel value of the read image and an average value of a corresponding region greater than a predetermined threshold as an abnormality.

10. The diagnostic apparatus according to claim 9, wherein the predetermined threshold is set for each diagnosis region.

11. The diagnostic apparatus according to claim 1, further comprising the reading unit that connects to the image forming apparatus.

12. The diagnostic apparatus according to claim 1, further comprising the reading unit and the image forming unit integrally formed with the image forming apparatus.

13. A method for controlling a diagnostic apparatus for diagnosing an abnormal portion of an image forming apparatus, comprising:

extracting diagnosis regions for specifying the abnormal portion from a read image obtained by a reading unit reading a printing medium conveyed along a conveying path from an image forming unit;

determining an abnormality in the extracted diagnosis regions; and specifying the abnormal portion on a basis of a result of the determining, wherein the diagnosis regions include an external region which is a region outside the printing medium of the read image, and a region in the printing medium having a read density different from a read density of the external region, wherein the method further comprises:

obtaining a first abnormal pixel position candidate in the external region using a first threshold, and obtain a second abnormal pixel position candidate in the region in the printing medium using a second threshold different from the first threshold, and specifying the reading unit as the abnormal portion in a case where the first abnormal pixel position candidate and the second abnormal pixel position candidate are at a same main scanning position in the read image.

* * * * *